(12) United States Patent
Lorge et al.

(10) Patent No.: US 9,489,453 B2
(45) Date of Patent: *Nov. 8, 2016

(54) BUILDING AN ONTOLOGY BY TRANSFORMING COMPLEX TRIPLES

(71) Applicant: International Business Machines Corporation, Armonk, NY (US)

(72) Inventors: Freddy Lorge, Vedrin (BE); Matthew A. Pantland, Johannesburg (ZA); Tom Rojahn, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,458

(22) Filed: Feb. 19, 2016

(65) Prior Publication Data
US 2016/0171099 A1 Jun. 16, 2016

Related U.S. Application Data

(63) Continuation of application No. 14/262,191, filed on Apr. 25, 2014, now Pat. No. 9,298,817, which is a continuation of application No. 13/432,120, filed on Mar. 28, 2012, now Pat. No. 8,747,115.

(51) Int. Cl.
*G09B 7/00* (2006.01)
*G06F 17/30* (2006.01)
(Continued)

(52) U.S. Cl.
CPC ....... *G06F 17/30734* (2013.01); *G06F 17/274* (2013.01); *G06F 17/2785* (2013.01);
(Continued)

(58) Field of Classification Search
CPC ...... G09B 19/0053; G09B 7/02; G09B 7/04; G09B 19/00; G06F 17/274; G06F 17/2872; G06F 17/2785; G06F 17/30734; G06F 17/30; G06F 17/3089; G06Q 30/0207; G06N 99/005; G06N 5/04; G06N 5/022

USPC ....... 434/118, 156, 322, 323, 350, 362, 265; 704/1, 4, 9; 705/14.1; 706/45–48, 55, 706/56, 61; 707/758, 759, 760

See application file for complete search history.

(56) References Cited

U.S. PATENT DOCUMENTS 6,092,099 A 7/2000 Irie et al.
6,167,370 A 12/2000 Tsourikov et al.
(Continued)

FOREIGN PATENT DOCUMENTS

EP 1596313 6/2006
WO 0115042 3/2001
(Continued)

OTHER PUBLICATIONS

Amendment filed Jan. 13, 2105 in response to Office Action (Mail Date Oct. 16, 2014) for U.S. Appl. No. 14/301,413, filed Jun. 11, 2014.

(Continued)

*Primary Examiner* — Jack Yip
(74) *Attorney, Agent, or Firm* — Schmeiser, Olsen & Watts; John Pivnichny

(57) ABSTRACT

An approach for building an ontology is provided. Syntactically transformed complex triples whose core terms are identified are semantically transformed into simplified triples referring to new conceptualized core terms formed by user selections from a lexical database or by adding a suffix to core terms. The core terms are assigned to respective definitions and keys in a reference ontology, thereby retaining the semantics of the complex triples. Based on the reference ontology, an enrichment transformation of the simplified triples is performed to create simplified and enriched triples by adding relations derived from a correspondence each term in the simplified triples has with the reference ontology and by adding representations of semantics of reference ontology definitions of the terms. The simplified and enriched triples are stored as an ontology representing knowledge in an application providing free-form text from which the complex triples were extracted.

11 Claims, 13 Drawing Sheets

(51) Int. Cl.

| | | |
|---|---|---|
| *G06F 17/27* | (2006.01) | |
| *G06F 17/28* | (2006.01) | |
| *G06N 5/02* | (2006.01) | |
| *G06N 5/04* | (2006.01) | |
| *G06Q 30/02* | (2012.01) | |
| *G09B 7/02* | (2006.01) | |
| *G09B 19/00* | (2006.01) | |
| *G09B 19/06* | (2006.01) | |

(52) U.S. Cl.
CPC ........... *G06F17/2872* (2013.01); *G06F 17/30* (2013.01); *G06F 17/3089* (2013.01); *G06F 17/30427* (2013.01); *G06F 17/30864* (2013.01); *G06N 5/02* (2013.01); *G06N 5/022* (2013.01); *G06N 5/025* (2013.01); *G06N 5/04* (2013.01); *G06N 5/047* (2013.01); *G06Q 30/0207* (2013.01); *G09B 7/02* (2013.01); *G09B 19/00* (2013.01); *G09B 19/06* (2013.01); *Y10S 707/99936* (2013.01); *Y10S 707/99942* (2013.01)

(56) References Cited

U.S. PATENT DOCUMENTS

| | | |
|---|---|---|
| 6,487,545 B1 | 11/2002 | Wical |
| 7,027,974 B1 | 4/2006 | Busch et al. |
| 7,228,302 B2 | 6/2007 | Kuchinsky et al. |
| 7,284,196 B2 | 10/2007 | Skeen et al. |
| 7,308,458 B2 | 12/2007 | Vincent, III |
| 7,401,087 B2 | 7/2008 | Copperman et al. |
| 7,433,876 B2 | 10/2008 | Spivack et al. |
| 7,493,333 B2 | 2/2009 | Hill et al. |
| 7,496,593 B2 | 2/2009 | Gardner et al. |
| 7,558,791 B2 | 7/2009 | Wahl |
| 7,743,078 B2 | 6/2010 | Azvine et al. |
| 7,890,518 B2 | 2/2011 | Aasman |
| 7,912,701 B1 | 3/2011 | Gray et al. |
| 7,966,305 B2 | 6/2011 | Olsen |
| 8,041,746 B2 | 10/2011 | Stuhec |
| 8,060,519 B2 | 11/2011 | Hosokawa |
| 8,078,647 B2 | 12/2011 | Liang et al. |
| 8,219,540 B2 | 7/2012 | Carter et al. |
| 8,352,403 B2 | 1/2013 | Lee et al. |
| 8,478,766 B1 | 7/2013 | Tsypliaev et al. |
| 8,528,018 B2 | 9/2013 | Patil et al. |
| 8,539,001 B1 | 9/2013 | Haim et al. |
| 8,747,115 B2 | 6/2014 | Lorge et al. |
| 8,793,208 B2 | 7/2014 | Rojahn |
| 8,799,330 B2 | 8/2014 | Haim et al. |
| 9,053,180 B2 | 6/2015 | Rojahn |
| 2003/0018616 A1 | 1/2003 | Wilbanks et al. |
| 2003/0074516 A1 | 4/2003 | Cho et al. |
| 2004/0010491 A1 | 1/2004 | Riedinger |
| 2004/0093331 A1 | 5/2004 | Garner et al. |
| 2005/0027681 A1 | 2/2005 | Bernstein et al. |
| 2005/0131920 A1 | 6/2005 | Rust et al. |
| 2005/0154723 A1 | 7/2005 | Liang |
| 2005/0228981 A1 | 10/2005 | Gavrilov et al. |
| 2006/0031757 A9 | 2/2006 | Vincent, III |
| 2006/0053098 A1 | 3/2006 | Gardner et al. |
| 2006/0053099 A1 | 3/2006 | Gardner et al. |
| 2006/0053151 A1 | 3/2006 | Gardner et al. |
| 2006/0053171 A1 | 3/2006 | Eldridge et al. |
| 2006/0053172 A1 | 3/2006 | Gardner et al. |
| 2006/0053174 A1 | 3/2006 | Gardner et al. |
| 2006/0053175 A1 | 3/2006 | Gardner et al. |
| 2006/0074832 A1 | 4/2006 | Gardner et al. |
| 2006/0074980 A1 | 4/2006 | Sarkar |
| 2007/0016563 A1 | 1/2007 | Omoigui |
| 2007/0179971 A1 | 8/2007 | Benson |
| 2007/0226203 A1 | 9/2007 | Adya et al. |
| 2008/0016036 A1 | 1/2008 | Omoigui |
| 2008/0021912 A1 | 1/2008 | Seligman et al. |
| 2008/0040308 A1 | 2/2008 | Ranganathan et al. |
| 2008/0091634 A1 | 4/2008 | Seeman |
| 2008/0091727 A1 | 4/2008 | Wynett et al. |
| 2008/0162498 A1 | 7/2008 | Omoigui |
| 2008/0189269 A1 | 8/2008 | Olsen |
| 2008/0195570 A1 | 8/2008 | Alsafadi et al. |
| 2008/0288456 A1 | 11/2008 | Omoigui |
| 2008/0294644 A1 | 11/2008 | Liu et al. |
| 2008/0313229 A1 | 12/2008 | Taswell |
| 2009/0048907 A1 | 2/2009 | Lieberman |
| 2009/0077094 A1 | 3/2009 | Bodain |
| 2009/0112903 A1 | 4/2009 | Liang et al. |
| 2009/0254572 A1 | 10/2009 | Redlich et al. |
| 2010/0036788 A1 | 2/2010 | Wu et al. |
| 2010/0115436 A1 | 5/2010 | Embley et al. |
| 2010/0121885 A1 | 5/2010 | Hosomi et al. |
| 2010/0131516 A1 | 5/2010 | Jean-Mary |
| 2010/0217784 A1 | 8/2010 | Carter et al. |
| 2011/0040717 A1 | 2/2011 | Rho et al. |
| 2011/0093467 A1 | 4/2011 | Sharp et al. |
| 2011/0113095 A1 | 5/2011 | Hatami-Hanza |
| 2011/0153539 A1 | 6/2011 | Rojahn |
| 2011/0238610 A1 | 9/2011 | Lee et al. |
| 2012/0173493 A1 | 7/2012 | Sabbouh |
| 2012/0239677 A1 | 9/2012 | Neale |
| 2013/0091119 A1 | 4/2013 | Huang et al. |
| 2013/0166303 A1 | 6/2013 | Chang et al. |
| 2013/0260358 A1 | 10/2013 | Lorge et al. |
| 2014/0052759 A1 | 2/2014 | Haim et al. |
| 2014/0237000 A1 | 8/2014 | Lorge et al. |
| 2014/0330871 A1 | 11/2014 | Rojahn |

FOREIGN PATENT DOCUMENTS

| | | |
|---|---|---|
| WO | 0221259 | 3/2002 |
| WO | 0235376 | 5/2002 |
| WO | 03042872 | 5/2003 |

OTHER PUBLICATIONS

Notice of Allowance (Mail Date Feb. 11, 2015) for U.S. Appl. No. 14/301,413, filed Jun. 11, 2014.
Office Action (Mail Date Oct. 16, 2014) for U.S. Appl. No. 14/301,413, filed Jun. 11, 2014.
Office Action (Mail Date Aug. 7, 2014) for U.S. Appl. No. 14/262,191, filed Apr. 25, 2014.
Amendment filed Dec. 8, 2014 in response to Office Action (Mail Date Aug. 7, 2014) for U.S. Appl. No. 14/262,191, filed Apr. 25, 2014.
Final Office Action (Mail Date Dec. 22, 2014) for U.S. Appl. No. 14/262,191, filed Apr. 25, 2014.
Amendment After Final filed Feb. 23, 2015 in response to Final Office Action (Mail Date Dec. 22, 2014) for U.S. Appl. No. 14/262,191, filed Apr. 25, 2014.
Advisory Action (Mail Date Apr. 17, 2015) for U.S. Appl. No. 14/262,191, filed Apr. 25, 2014.
Notice of Appeal filed May 13, 2015 for U.S. Appl. No. 14/262,191, filed Apr. 25, 2014.
Appeal Brief filed Jul. 9, 2015 for U.S. Appl. No. 14/262,191, filed Apr. 25, 2014.
Notice of Allowance (Mail Date Dec. 23, 2015 for U.S. Appl. No. 14/262,191, filed Apr. 25, 2014.
Notice of Allowance (Mail Date May 13, 2014) for U.S. Appl. No. 13/432,120, filed Mar. 28, 2012.
Shvaiko et al.; A Survey of Schema-based Matching Approaches; Technical Report #DIT-04-087; University of Trento, Department of Information and Communication Technology; Oct. 2004; 27 pages.
Euzenat et al.; An integrative proximity measure for ontology alignment; Proceedings of the 1st International Vorkshop on Semantic Integration at the International Semantic Web conference 9ISWC); 2003; 6 pages.
Hu et al.; discovering simple Mappings Between Relational Database Schemas and Ontologies; In Proceedings of the 6th International Semantic Web Conference, 2nd Asian Semantic Web Conference (ISWC/ASWC2007); Nov. 11-15, 2007; 14 pages.

(56) References Cited

OTHER PUBLICATIONS

Raghavan et al.; Schema Mapper: A Visualization Tool for DL Integration; JCDL '05; Jun. 7-11, 2005; p. 414.

Mir et al.; An Unsupervised Approach for Acquiring Ontologies and RDF Data from Online Life Science Databases; Lecture Notes in Computer Science; vol. 6089; Springer-Verlag Berlin Heidelberg 2010; The Semantic Web: Research and Applications, 7th Extended Semantic Web Conference; ESWC 2010; Heraklion, Crete, Greece, May 30-Jun. 3, 2010; Proceedings, Part II; 15 pages.

Hayes et al.; A Collaborative Development Environment for Ontologies (CODE); Semantic Integration Workshop (ISWC); Oct. 2003; 5 pages.

Balakrishna et al.; Automatic Ontology Creation from Text for National Intelligence Priorities Framework (NIPF); Proceedings of 3rd International Ontology for the Intelligence Community (OIC) Conference, 5 pages; Dec. 3-4, 2008.

Petersen, Ulrik; Automatic Lexicon-based Ontology-creation, A methodological study; Master's Thesis research paper; Aalborg University; Jan. 6, 2003; 47 pages.

Ostrovsky et al., Efficiently Merging Graph Nodes With Application to Cluster Analysis, Apr. 20, 2007, 13 pages.

Volkel et al., Semversion: An RDF-Based Ontology Versioning System, IADIS International Conference WWW/Internet; Oct. 2006, pp. 195-202.

International Search Report and Written Opinion (Mail Date Jun. 11, 2013); International Application No. PCT/IB2013/051823; Filing Date Mar. 7, 2013; 8 pages.

Morita et al.; Information Integration with Linked Data; Journal of the Japanese Society for Artificial Intelligence; vol. 27, No. 2; Mar. 1, 2012; pp. 189-199.Morita et al.; Information Integration with Linked Data; Journal of the Japanese Society for Artificial Intelligence; vol. 27, No. 2; Mar. 1, 2012; pp. 189-199.

Nakayama et al.; A Method based on NLP with Link Structure Mining to Construct a Web Ontology for Wikipedia; The Institute of Electronics, Information and Communication Engineers; the Journal of 19th Data Engineering Workshop; Apr. 7, 2008; pp. 1-6.

Tamagawa et al.; Learning a Large Scale of Ontology from Japanese Wikipedia, Transaction of the Japanese Society for Artificial Intelligence; vol. 25 (2010), No. 5; The Japanese Society for Artificial Intelligence; Aug. 17, 2010; pp. 623-636 [retrieved from the Internet Jun. 3, 2013, URL https://www.jstage.jst.go.jp/article/tjs ai/25/5/25_5_623/_article/-char/ja/].

Halpin; Ontological Modeling; May 17, 2011; www.orm.net (From Internet Wayback Machine); retrieved from the Internet Sep. 20, 2013; 51 pages (in connection with Non-Final Office Action dated Sep. 26, 2013—U.S. Appl. No. 13/432,120).

Peroni, et al.; Identifying key concepts in an ontology through the integration of cognitive principles with statistical and topological measures; 2009 (From Internet Wayback Machine URL: web.archive.org/web/20090615000000*/http:1/people.k mi.open.ac.u k/motta/ ... /key_c oncepts_aswc.pdf); Retrieved from the Internet Sep. 21, 2013; 16 pages (in connection with Non-Final Office Action dated Sep. 26, 2013—U.S. Appl. No. 13/432,120).

Office Action (Mail Date Oct. 25, 2013) for U.S. Appl. No. 12/916,456, filed Oct. 29, 2010.

Amendment filed Feb. 3, 2014 in response to Office Action (Mail Date Oct. 25, 2013) for U.S. Appl. No. 12/916,456, filed Oct. 29, 2010.

Notice of Allowance (Mail Date Mar. 7, 2014) for U.S. Appl. No. 12/916,456, filed Oct. 29, 2010.

U.S. Appl. No. 13/589,614, filed Aug. 20, 2012.

Notice of Allowance (Mail Date May 8, 2013) for U.S. Appl. No. 13/589,614, filed Aug. 20, 2012.

Office Action (Mail Date Sep. 26, 2013) for U.S. Appl. No. 13/432,120, filed Mar. 28, 2012.

Amendment filed Dec. 24, 2013 in response to Office Action (Mail Date Sep. 26, 2013) for U.S. Appl. No. 13/432,120, filed Mar. 28, 2012.

Notice of Allowance (Mail Date Jan. 27, 2014) for U.S. Appl. No. 13/432,120, filed Mar. 28, 2012.

Notice of Allowance (Mail Date Mar. 20, 2014) for U.S. Appl. No. 13/957,550, filed Aug. 2, 2013.

BUILDING AN ONTOLOGY BY TRANSFORMING COMPLEX TRIPLES

This application is a continuation application claiming priority to Ser. No. 14/262,191 filed Apr. 25, 2014, now U.S. Pat. No. 9,298,817, issued Mar. 29, 2016, which is a continuation application claiming priority to Ser. No. 13/432,120 filed Mar. 28, 2012, now U.S. Pat. No. 8,747,115, issued Jun. 10, 2014, and is related to U.S. patent application Ser. No. 12/916,456 (U.S. Patent Application Publication No. 2011/0153539) entitled "IDENTIFYING COMMON DATA OBJECTS REPRESENTING SOLUTIONS TO A PROBLEM IN DIFFERENT DISCIPLINES," filed on Oct. 29, 2010, now U.S. Pat. No. 8,793,208, issued Jul. 29, 2014, and hereby incorporated by reference in their entirety.

TECHNICAL FIELD

The present invention relates to a data processing method and system for knowledge management, and more particularly to a technique for generating an ontology.

BACKGROUND

An ontology is a representation of knowledge by a set of concepts and relationships between the concepts, where the knowledge is included within software-based applications. When each application has its own ontology, semantic interoperability between the applications is not immediate because any request expressed in the context of one ontology must be translated before being processed in the context of the other ontology. To provide the aforementioned interoperability in known systems, the structure (i.e., concepts and relationships between the concepts) of the ontologies are mapped and requests and answers to the requests are translated using the ontology mapping. Mismatches between ontologies may be based on the ontologies using languages that differ in syntax, constructs or semantics of their primitive. To avoid language-level mismatches between ontologies, each ontology may use the same language, such as Resource Description Framework (RDF). RDF is based on statements in the form of subject-predicate-object expressions, which are called triples or triplets. Other mismatches can arise when the ontologies are created using different methods and techniques. In such cases, the same concept can have different names in different ontologies, the same name can be used for different concepts in different ontologies, the different conceptualization approaches can lead to different representations (e.g., classes vs. properties and classes vs. sub-classes).

BRIEF SUMMARY

In a first embodiment, the present invention provides a method of building an ontology. The method comprises the steps of:

a computer receiving a plurality of complex triples extracted from free-form text provided by a software application, each complex triple including a compound subject, a compound predicate and a compound object;

the computer performing a syntactic transformation of the plurality of complex triples by, based on a grammar, identifying core terms and non-core terms in the plurality of complex triples, identifying syntactic elements in the plurality of complex triples including nouns, verbs, adjectives and adverbs, and standardizing the plurality of complex triples, wherein a result of the step of performing the syntactic transformation is a plurality of syntactically transformed complex triples whose terms are aligned to the grammar;

the computer performing a semantic transformation of the plurality of syntactically transformed complex triples into respective one or more simplified triples included in a plurality of simplified triples by assigning each core term included in the plurality of simplified triples to exactly one term definition and to exactly one identification key of a reference ontology, wherein each simplified triple includes a subject term, a predicate term and an object term, and wherein each of the one or more simplified triples retains the semantics of the respective syntactically transformed complex triple;

based on a meta-schema of the reference ontology, the computer performing an enrichment transformation of the plurality of simplified triples into a plurality of simplified and enriched triples by adding relations derived from a correspondence each term in the plurality of simplified triples has with the reference ontology and by adding representations of semantics of definitions of terms in the plurality of simplified triples, wherein the definitions are included in the reference ontology; and the computer storing the plurality of simplified and enriched triples as a new ontology that represents knowledge included within the software application that provides the free-form text.

In a second embodiment, the present invention provides a computer system for building an ontology. The computer system comprises:

a central processing unit (CPU);

a memory coupled to the CPU;

a computer-readable, tangible storage device coupled to the CPU, the storage device containing instructions that are carried out by the CPU via the memory to implement a method of building an ontology, the method comprising the steps of:

the computer system receiving a plurality of complex triples extracted from free-form text provided by a software application, each complex triple including a compound subject, a compound predicate and a compound object;

the computer system performing a syntactic transformation of the plurality of complex triples by, based on a grammar, identifying core terms and non-core terms in the plurality of complex triples, identifying syntactic elements in the plurality of complex triples including nouns, verbs, adjectives and adverbs, and standardizing the plurality of complex triples, wherein a result of the step of performing the syntactic transformation is a plurality of syntactically transformed complex triples whose terms are aligned to the grammar;

the computer system performing a semantic transformation of the plurality of syntactically transformed complex triples into respective one or more simplified triples included in a plurality of simplified triples by assigning each core term included in the plurality of simplified triples to exactly one term definition and to exactly one identification key of a reference ontology, wherein each simplified triple includes a subject term, a predicate term and an object term, and wherein each of the one or more simplified triples retains the semantics of the respective syntactically transformed complex triple;

based on a meta-schema of the reference ontology, the computer system performing an enrichment transformation of the plurality of simplified triples into a plurality of simplified and enriched triples by adding relations derived from a correspondence each term in the plurality of simplified triples has with the reference ontology and by adding representations of semantics of definitions of terms in the plurality of simplified triples, wherein the definitions are included in the reference ontology; and the computer system storing the plurality of simplified and enriched triples as a new ontology that represents knowledge included within the software application that provides the free-form text.

In a third embodiment, the present invention provides a computer program product, comprising:

a computer-readable, tangible storage device; and a computer-readable program code stored in the computer-readable, tangible storage device, the computer-readable program code containing instructions that are carried out by a central processing unit (CPU) of a computer system to implement a method of building an ontology, the method comprising the steps of:

the computer system receiving a plurality of complex triples extracted from free-form text provided by a software application, each complex triple including a compound subject, a compound predicate and a compound object;

the computer system performing a syntactic transformation of the plurality of complex triples by, based on a grammar, identifying core terms and non-core terms in the plurality of complex triples, identifying syntactic elements in the plurality of complex triples including nouns, verbs, adjectives and adverbs, and standardizing the plurality of complex triples, wherein a result of the step of performing the syntactic transformation is a plurality of syntactically transformed complex triples whose terms are aligned to the grammar;

the computer system performing a semantic transformation of the plurality of syntactically transformed complex triples into respective one or more simplified triples included in a plurality of simplified triples by assigning each core term included in the plurality of simplified triples to exactly one term definition and to exactly one identification key of a reference ontology, wherein each simplified triple includes a subject term, a predicate term and an object term, and wherein each of the one or more simplified triples retains the semantics of the respective syntactically transformed complex triple;

based on a meta-schema of the reference ontology, the computer system performing an enrichment transformation of the plurality of simplified triples into a plurality of simplified and enriched triples by adding relations derived from a correspondence each term in the plurality of simplified triples has with the reference ontology and by adding representations of semantics of definitions of terms in the plurality of simplified triples, wherein the definitions are included in the reference ontology; and the computer system storing the plurality of simplified and enriched triples as a new ontology that represents knowledge included within the software application that provides the free-form text.

In a fourth embodiment, the present invention provides a process for supporting computing infrastructure. The process comprises providing at least one support service for at least one of creating, integrating, hosting, maintaining, and deploying computer-readable code in a computer system comprising a processor, wherein the processor carries out instructions contained in the code causing the computer system to perform a method of building an ontology, wherein the method comprises the steps of:

the computer system receiving a plurality of complex triples extracted from free-form text provided by a software application, each complex triple including a compound subject, a compound predicate and a compound object;

the computer system performing a syntactic transformation of the plurality of complex triples by, based on a grammar, identifying core terms and non-core terms in the plurality of complex triples, identifying syntactic elements in the plurality of complex triples including nouns, verbs, adjectives and adverbs, and standardizing the plurality of complex triples, wherein a result of the step of performing the syntactic transformation is a plurality of syntactically transformed complex triples whose terms are aligned to the grammar;

the computer system performing a semantic transformation of the plurality of syntactically transformed complex triples into respective one or more simplified triples included in a plurality of simplified triples by assigning each core term included in the plurality of simplified triples to exactly one term definition and to exactly one identification key of a reference ontology, wherein each simplified triple includes a subject term, a predicate term and an object term, and wherein each of the one or more simplified triples retains the semantics of the respective syntactically transformed complex triple;

based on a meta-schema of the reference ontology, the computer system performing an enrichment transformation of the plurality of simplified triples into a plurality of simplified and enriched triples by adding relations derived from a correspondence each term in the plurality of simplified triples has with the reference ontology and by adding representations of semantics of definitions of terms in the plurality of simplified triples, wherein the definitions are included in the reference ontology; and the computer system storing the plurality of simplified and enriched triples as a new ontology that represents knowledge included within the software application that provides the free-form text.

Embodiments of the present invention produce well-formed and rich ontology schemas that are conceptually correct and adapted to the automatic discovery of cross-ontology correspondences, thereby providing automatic semantic interoperability and semantic integration between software-based applications. Over time, the ontology building system presented herein may become more efficient through automatic enrichment provided by re-using semantic schema of definitions from a reference ontology and semantic schema of new concepts that are not available in the reference schema. Embodiments of the present invention are adaptable and can evolve over time by allowing a knowledge engineer to analyze lists of invented terms and the way pre-defined structure and relationships are used in order to improve the grammar, the ontology meta-schema and transformation rules. The adaptations of the ontology meta-schema are improvements that do not invalidate the ontologies built with previous versions of the meta-schema. Furthermore, embodiments of the present invention accept complex triples at any level of complexity, where the complex triples may be produced from any data source by specific adapters. Still further, an embodiment of the present invention avoids mismatches that currently arise when different methods and techniques are used to create ontologies, and thereby enables automatic merging of ontologies, even when the ontologies address different domains of expertise.

DETAILED DESCRIPTION

Overview

Embodiments of the present invention receive complex triples extracted from a universe of discourse of any given software-based application, where a complex triple is in the form of <compound subject, compound predicate, compound object>, and where each of the compound subject, predicate and object in the complex triple can be at any level of complexity. In one embodiment, the universe of discourse is a set of free-form text (i.e., unstructured text). The complex triples do not form an ontology because the complex triples are too complex to provide a clear identification of concepts and relationships. Embodiments disclosed herein use the complex triples to build an ontology by simplifying and transforming the complex triples into simple triples (e.g., RDF triples) that are semantically equivalent to, and richer than, the initial complex triples. The ontologies built by embodiments of the present invention are well-formed, conceptually correct, and adapted to an automatic discovery of cross-ontology correspondences, even when the ontologies address different domains of expertise.

Embodiments of the present invention build ontologies strongly aligned with a single reference ontology (i.e., upper ontology), where alignment of each ontology is performed during the building phase of the ontology. The alignment of every built ontology with the reference ontology may be accomplished by applying a set of transformation rules to the extracted complex triples. Embodiments of the present invention ensure that a first concept taken from a first ontology and a second concept taken from a second ontology are identical if and only if the first and second concepts have the same reference identification key in the reference ontology, because the ontologies are built with the same method and refer to the same reference ontology. In embodiments presented herein, two concepts map between ontologies if and only if the concepts have the same key. Therefore, two ontologies may be merged on their identical concepts, thereby facilitating semantic search and inferences, and also facilitating integration tasks such as data transformation, query answering, web-service composition, etc.

System for Building an Ontology by Transforming Complex Triples

Figure 1:
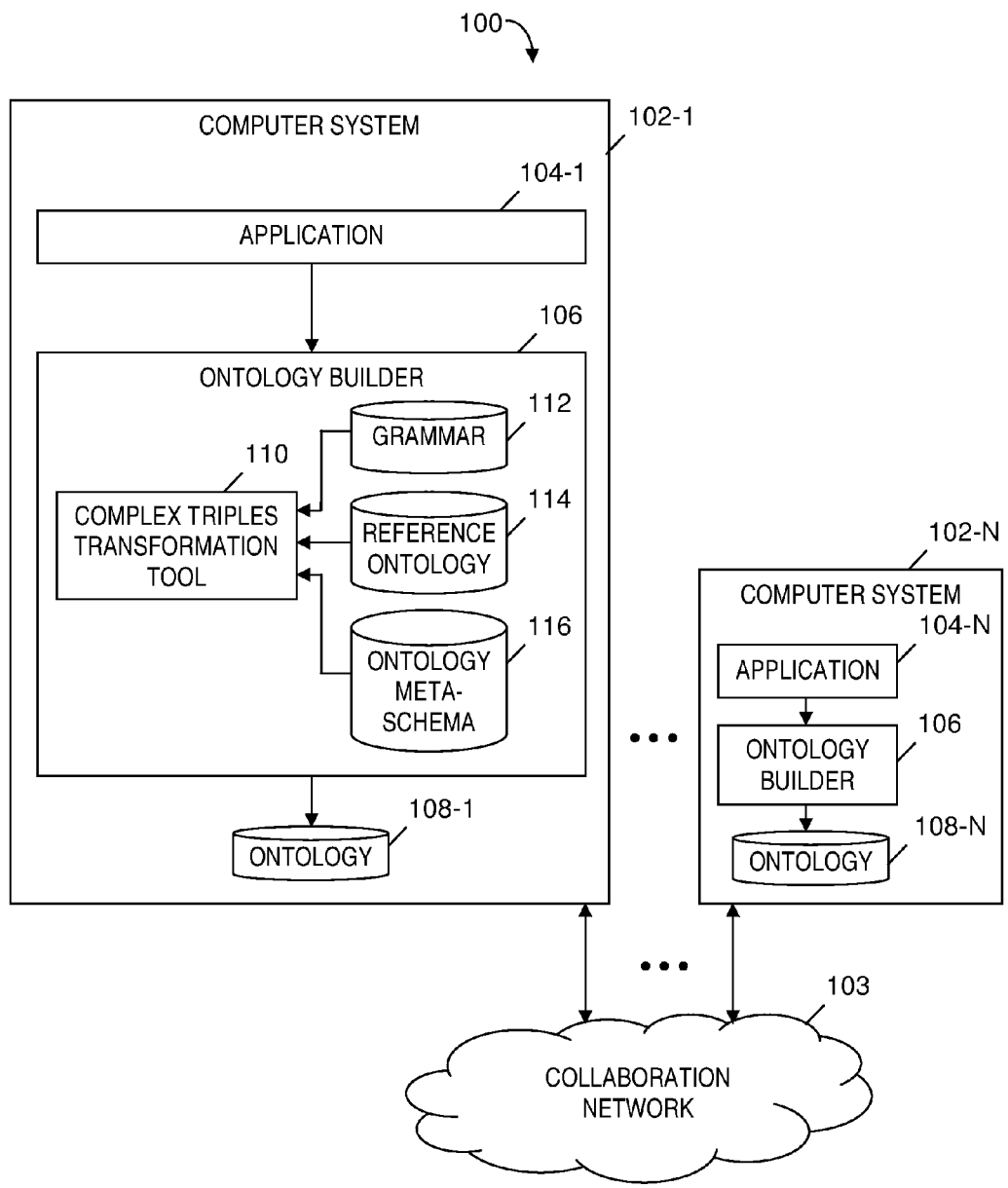
FIG. 1 is a block diagram of a system for building an ontology by transforming complex triples, in accordance with embodiments of the present invention.

FIG. 1 is a block diagram of a system for building an ontology by transforming complex triples, in accordance with embodiments of the present invention. An ontology building system 100 includes N computer systems 102-1 . . . 102-N, where N is an integer greater than one. Computer systems 102-1 . . . 102-N are in communication with each other and/or with other computer systems via a collaboration network 103. Collaboration network 103 is a computer network such as the Internet or an intranet.

Computer system 102-1 runs a software-based application 104-1 and includes a software and hardware-based ontology builder 106. Computer system 102-1 includes an ontology data repository 108-1 in which an ontology built by ontology builder 106 is stored. Ontology builder 106 includes a software-based complex triples transformation tool 110, and one or more data repositories that store a grammar 112 (i.e., a set of syntactic rules), a reference ontology 114, and an ontology meta-schema 116, which includes a meta-schema of reference ontology 114.

In one embodiment, reference ontology 114 must at least include the following information for each term in the reference ontology:
  A list of synonyms of the term
  A unique key to identify the term
  A short definition (e.g., a one-sentence definition) of the term
  A version-id referring to the version of the reference ontology
  A list of derived terms (i.e., other terms derived from the term)
  A syntactic category (e.g., noun, verb, adverb, or adjective) of the term In one embodiment, for a term whose syntactic category is "adjective," reference ontology 114 includes at least the following information:
  Whether or not the term is a pertainym (i.e., an adjective that can be defined as "of or pertaining to" another word).
  The attribute from which the term derives In one embodiment, for a term whose syntactic category is "adverb," reference ontology 114 includes at least the hierarchy of possible pertainyms associated with the term.

In one embodiment, for a term whose syntactic category is "noun," reference ontology 114 includes at least the following information:
  Whether or not the term is an attribute
  Whether or not the term relates to a cluster of adjectives
  A list of similar adjectives in each of the possible clusters of adjectives
  The hierarchy of possible hypernyms of the term. Y is a hypernym of the noun X if every X is a Y or a kind of Y (e.g., canine is a hypernym of dog)
  The hierarchy of possible hyponyms of the term. Y is a hyponym of noun X if every Y is an X or a kind of X (e.g., dog is a hyponym of canine).

In one embodiment, for a term whose syntactic category is "verb," reference ontology 114 includes at least the following information:
  The full list of groups relating to the verb
  The full list of entailments relating to the verb. The verb Y is entailed by X if by doing X, one must be doing Y (e.g., to sleep is entailed by to snore).

The full list of hypernyms relating to the verb. The verb Y is a hypernym of the verb X if the activity X is a Y or a kind of Y (e.g., to perceive is an hypernym of to listen)

The full list of troponyms relating the verb. The verb Y is a troponym of the verb X if the activity Y is doing X in some manner (e.g., to lisp is a troponym of to talk).

Similar to computer system 102-1, computer system 102-N runs a software-based application 104-N and includes ontology builder 106. Computer system 102-N also includes an ontology data repository 108-N for storing an ontology built by ontology builder 106, which is included in computer system 102-N. Although not shown, ontology builder 106 included in computer system 102-N includes the complex triples transformation tool 110 and one or more data repositories for storing a grammar, a reference ontology and ontology meta-schema that have functionalities analogous to the functionalities of grammar 112, reference ontology 114 and ontology meta-schema 116, respectively.

In one embodiment, one or more other computer systems (not shown) are in communication with computer system 102-1 and computer system 102-N via collaboration network 103, and each of the one or more other computer systems includes components analogous to the components included in computer system 102-1 and computer system 102-N. In one embodiment, each node of collaboration network 103 is a computer system that includes the same ontology builder 106, which implements the same ontology building method described below relative to FIG. 2, FIG. 3, FIGS. 4A-4F, FIG. 5 and FIG. 6.

In an alternate embodiment, application 104-1 and/or ontology data repository 108-1 are included in a computer system external to computer system 102-1.

Each application 104-1 . . . 104-N may be a software-based application of any kind. For example, application 104-1 may be an end user blog that includes free-form text, a messaging system, an interactive game, or any kind of business application.

Using ontology builder 106 in computer systems 102-1 . . . 102-N, an embodiment of the present invention generates ontologies in a manner that allows an automated identification of correspondences between concepts (i.e., subjects and objects) and relationships (i.e., predicates) across ontologies. An embodiment of the present invention is able to provide (and does provide) the correspondences between the relationships because the predicates are conceptualized (i.e., nounified), which is discussed in more detail below. After the correspondences between concepts and relationships are identified, the ontologies may be automatically merged, enabling automatic semantic interoperability between applications 104-1 . . . 104-N or semantic collaboration among end users (not shown) of computer systems 102-1 . . . 102-N. In one embodiment, applications 104-1 . . . 104-N are developed independently of one another. Ontology builder 106 processes output from each application (e.g., application 104-1) to create ontologies (e.g., ontologies stored in ontology data repository 108-1. Because each ontology created by ontology builder 106 in computer systems 102-1 . . . 102-N use the same method, the ontologies can communicate with each other, thereby enabling semantic collaboration among applications 104-1 . . . 104-N.

The functionality of the components of computer system 102-1 is described in the discussions presented below relative to FIG. 2, FIG. 3, FIGS. 4A-4F, FIG. 5 and FIG. 6.

Processes for Building an Ontology by Transforming Complex Triples

Figure 2:
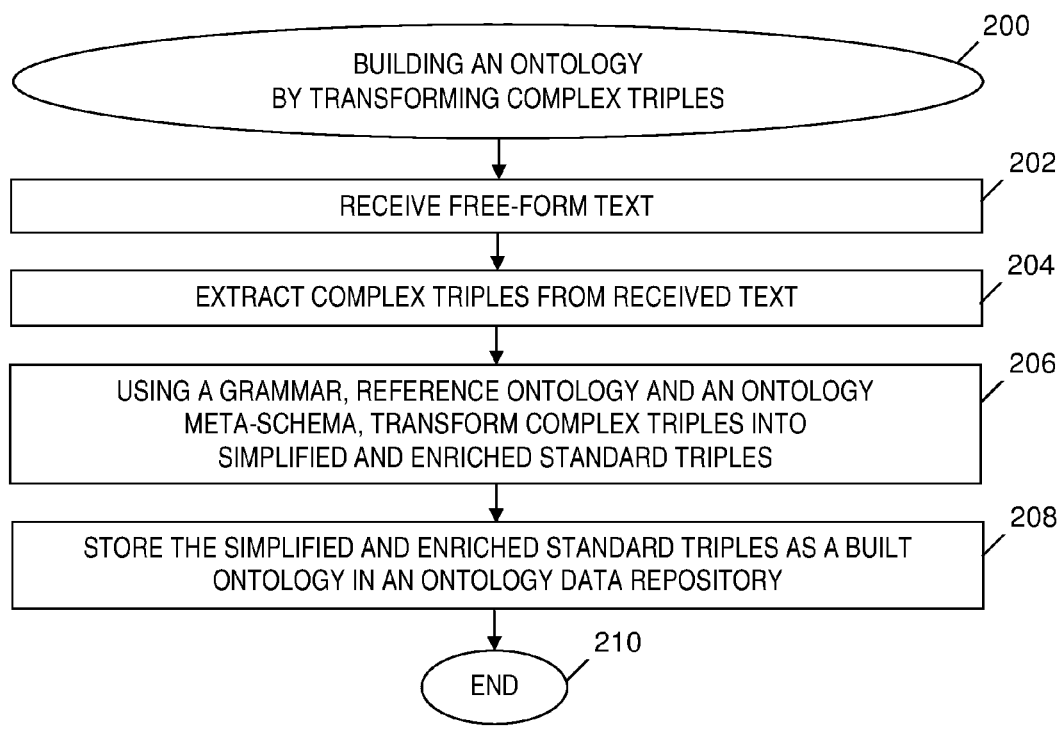
FIG. 2 is a flowchart of a process of building an ontology by transforming complex triples, where the process is implemented in the system of FIG. 1, in accordance with embodiments of the present invention.

FIG. 2 is a flowchart of a process of building an ontology by transforming complex triples, where the process is implemented in the system of FIG. 1, in accordance with embodiments of the present invention. Although the steps in process of FIG. 2 are discussed as being performed by components of computer system 102-1 (see FIG. 1), it should be apparent to those skilled in the art that the steps of FIG. 2 may be performed by analogous components in any other computer system included in system 100 in FIG. 1 (e.g., computer system 102-N in FIG. 1). The process of building an ontology by transforming complex triples begins at step 200. In step 202, ontology builder 106 (see FIG. 1) receives free-form text provided by application 104-1 (see FIG. 1).

In step 204, ontology builder 106 (see FIG. 1) extracts complex triples from the free-form text received in step 202. In one embodiment, a software-based Natural Language Processing (NLP) extraction tool included in ontology builder 106 (see FIG. 1) receives the free-form text in step 202 and creates or extracts the complex triples from the free-form text in step 204. In an alternate embodiment, a software-based extraction tool external to ontology builder 106 (see FIG. 1) receives the free-form text provided by application 104-1 (see FIG. 1) in step 202, extracts the complex triples from the free-form text in step 204, and sends the extracted complex triples to ontology builder 106 (see FIG. 1) between steps 204 and 206. An example of an extraction tool is LanguageWare® offered by International Business Machines Corporation located in Armonk, N.Y.

In step 206, using a set of transformation rules stored in ontology meta-schema 116 (see FIG. 1), complex triples transformation tool 110 (see FIG. 1) transforms the complex triples extracted in step 204 into simplified standard triples that are subsequently enriched with semantically relevant information. The transformation performed in step 206 includes a series of three different procedures performed by complex triples transformation tool 110 (see FIG. 1): (1) syntactic transformation; (2) semantic transformation; and (3) enrichment transformation.

The syntactic transformation in step 206 includes analyzing the complex triples extracted in step 204 according to grammar 112 (see FIG. 1) that is defined and received by computer system 102-1 (see FIG. 1) prior to the process of FIG. 2. The syntactic transformation includes transforming the complex triples to match grammar 112 (see FIG. 1), identifying the terms in the complex triples that require a semantic transformation, and standardizing the complex triples in preparation for the semantic transformation.

The syntactic transformation is discussed further below relative to FIG. 3 and FIGS. 4A-4F.

The semantic transformation in step 206 is performed after the syntactic transformation and includes simplifying the complex triples resulting from the syntactic transformation while retaining the semantics of the complex triples. That is, one or more simplified triples resulting from semantically transforming a complex triple in step 206 are semantically equivalent to the transformed complex triple.

The semantic transformation includes aligning the different core terms of the simplified triples with reference ontology 114 (see FIG. 1). Every core term in the simplified triples is assigned one and only one term definition and one and only one identification key included in reference ontology 114 (see FIG. 1). Core terms are discussed and defined below relative to the discussion of FIG. 3. If complex triples transformation tool 110 (see FIG. 1) determines that a term needed in a simplified triple is not in reference ontology 114

(see FIG. 1), then complex triples transformation tool 110 (see FIG. 1) invents the needed term.

Each triple resulting from step 206 is a simplified triple because it contains only single terms and implements binary relationships. In one embodiment, a simplified triple resulting from the semantic transformation in step 206 has the form (subject_term, predicate_term, object_term) (i.e., the simplified triple is in a RDF format for triples).

The semantic transformation is discussed further below relative to FIG. 3 and FIG. 5.

The enrichment transformation in step 206 enriches the simplified triples resulting from the semantic transformation included in step 206 by adding relations from the correspondence each term in the simplified triples has with reference ontology 114 (see FIG. 1), and by adding a representation of the semantics given by the definition each term has in reference ontology 114 (see FIG. 1). To perform the enrichment transformation in step 206, complex triples transformation tool 110 (see FIG. 1) requires a knowledge of the structure of reference ontology 114 (see FIG. 1). The aforementioned knowledge of the structure of reference ontology 114 (see FIG. 1) is a meta-schema of the reference ontology. Ontology builder 106 (see FIG. 1) stores the meta-schema of the reference ontology 114 (see FIG. 1) as part of ontology meta-schema 116 (see FIG. 1).

The enrichment transformation is discussed further below relative to FIG. 3 and FIG. 6.

In step 208, ontology builder 106 (see FIG. 1) stores the simplified and enriched standard triples as a newly built ontology in ontology data repository 108-1 (see FIG. 1). The process of FIG. 2 ends at step 210.

In one embodiment, in step 208, ontology builder 106 (see FIG. 1) stores the simplified and enriched standard triples in an ontology database included in ontology data repository 108-1 (see FIG. 1). In one embodiment, in step 208, ontology builder 106 (see FIG. 1) stores the newly built ontology together with the complex triples extracted in step 204 in a set of database tables that are specified in ontology meta-schema 116 (see FIG. 1). The aforementioned set of database tables implements a set of standard relationships that include (1) the different kinds of relationships a term in a complex triple or in a simplified and enriched triple can have with reference ontology 114 (see FIG. 1); (2) the relationships between the complex triples extracted in step 204 and the simplified and enriched triples resulting from step 206; and (3) the different standard relationships produced by the semantic transformation included in step 206.

In one embodiment, the process of FIG. 2 is repeated at different computer systems in FIG. 1 to build multiple ontologies, where each performance of the process of FIG. 2 builds a corresponding ontology of the multiple ontologies. Embodiments of the present invention may automatically perform semantic integration of the multiple and possibly cross-domain ontologies because the multiple ontologies are all built by the process of FIG. 2.

Transforming Complex Triples

Figure 3:
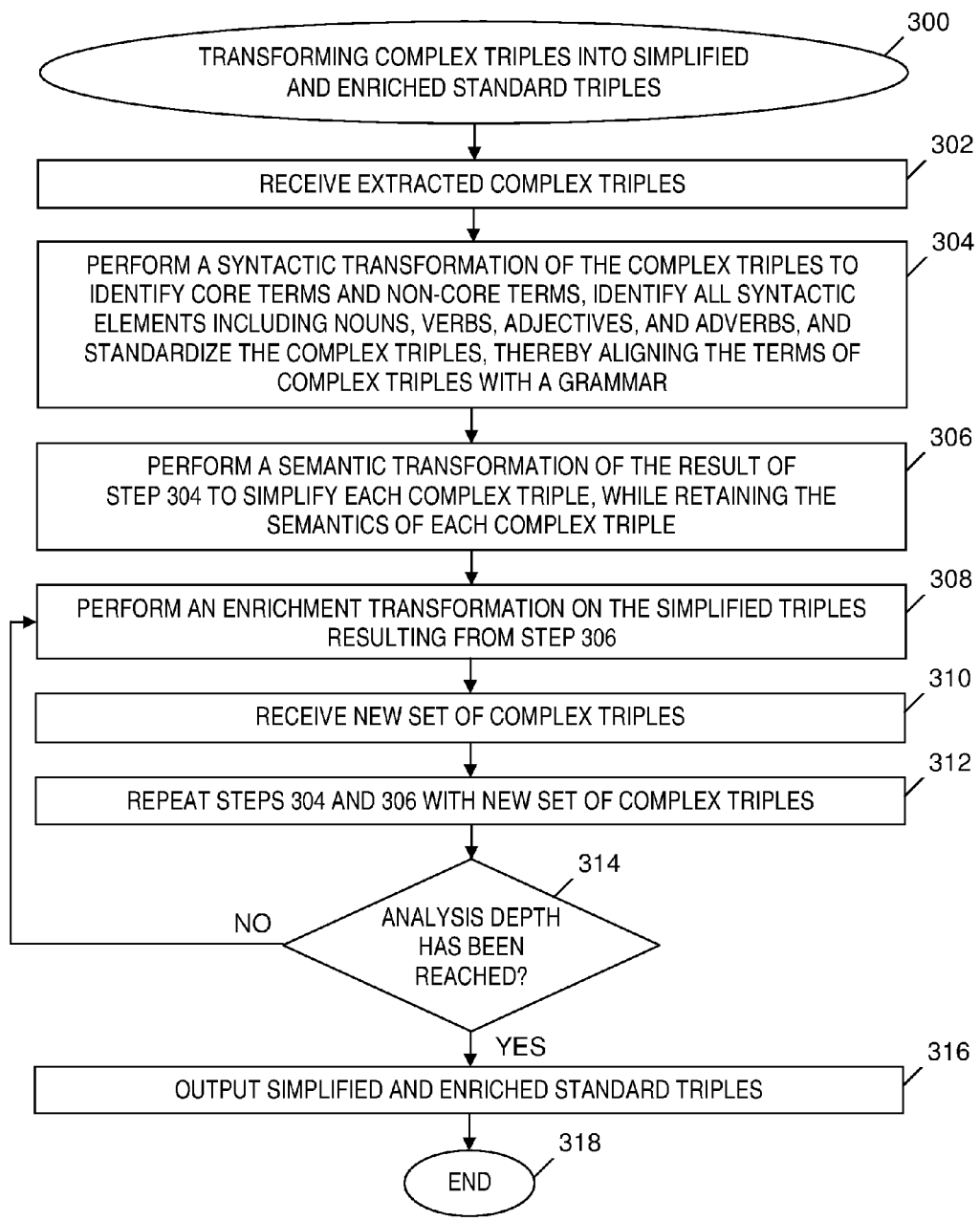
FIG. 3 is a flowchart of a process of transforming complex triples in the process of FIG. 2, in accordance with embodiments of the present invention.

FIG. 3 is a flowchart of a process of transforming complex triples in the process of FIG. 2, in accordance with embodiments of the present invention. In one embodiment, the process of FIG. 3 is included in step 206 (see FIG. 2). The process of transforming complex triples into simplified and enriched standard triples starts at step 300. In step 302, complex triples transformation tool 110 (see FIG. 1) receives complex triples that had been extracted from free-form text prior to step 302.

In step 304, complex triples transformation tool 110 (see FIG. 1) performs a syntactic transformation of the complex triples received in step 302 to align terms of the complex triples with grammar 112 (see FIG. 1), which is defined prior to step 302. The syntactic transformation includes identifying core terms and non-core terms included in the complex triples, and further includes identifying the types (i.e., syntactic categories) of the terms in the complex triples that are to be analyzed, including at least nouns, verbs, adjectives and adverbs. In another embodiment, step 304 includes identifying prepositions. Still further, the syntactic transformation in step 304 includes standardizing the complex triples to prepare the resulting complex triples for the semantic transformation in step 306 and the enrichment transformation in step 308.

As used herein, a core term is defined as a term in a complex triple that is at least part of the basis of the semantics represented by the complex triple (i.e., a core term is a term without which semantics represented by a triple would be lost). A core term is not always a concept (i.e., a subject or an object) or a relationship (i.e., a predicate); a core term may be an adverb or adjective because adverbs and adjectives carry important semantics.

The result of step 304 includes syntactically transformed complex triples. In one embodiment, step 304 is implemented by the process depicted in FIGS. 4A-4F.

In step 306, complex triples transformation tool 110 (see FIG. 1) performs a semantic transformation of the complex triples resulting from step 304. The semantic transformation in step 306 includes aligning every identified core term with respective definitions in reference ontology 114 (see FIG. 1) by using transformation rules stored in ontology meta-schema 116 (see FIG. 1). The semantic transformation in step 306 includes aligning core term(s) not found in reference ontology 114 (see FIG. 1) with respective invented term(s) that are stored with their corresponding definitions in ontology meta-schema 116 (see FIG. 1). Furthermore, the semantic transformation in step 306 may invent one or more new terms that are subsequently stored in ontology meta-schema 116 (see FIG. 1) by complex triples transformation tool 110 (see FIG. 1).

The result of step 306 is a set of simplified triples (i.e., semantically transformed triples) that retain the semantics of the complex triples received in step 302 and that retains the semantics of the syntactically transformed triples that resulted from step 304. Each complex triple resulting from step 304 may be semantically transformed in step 306 to one or more simplified triples. The set of simplified triples resulting from step 306 is included in the ontology being built by the process of FIG. 2.

Figure 5:
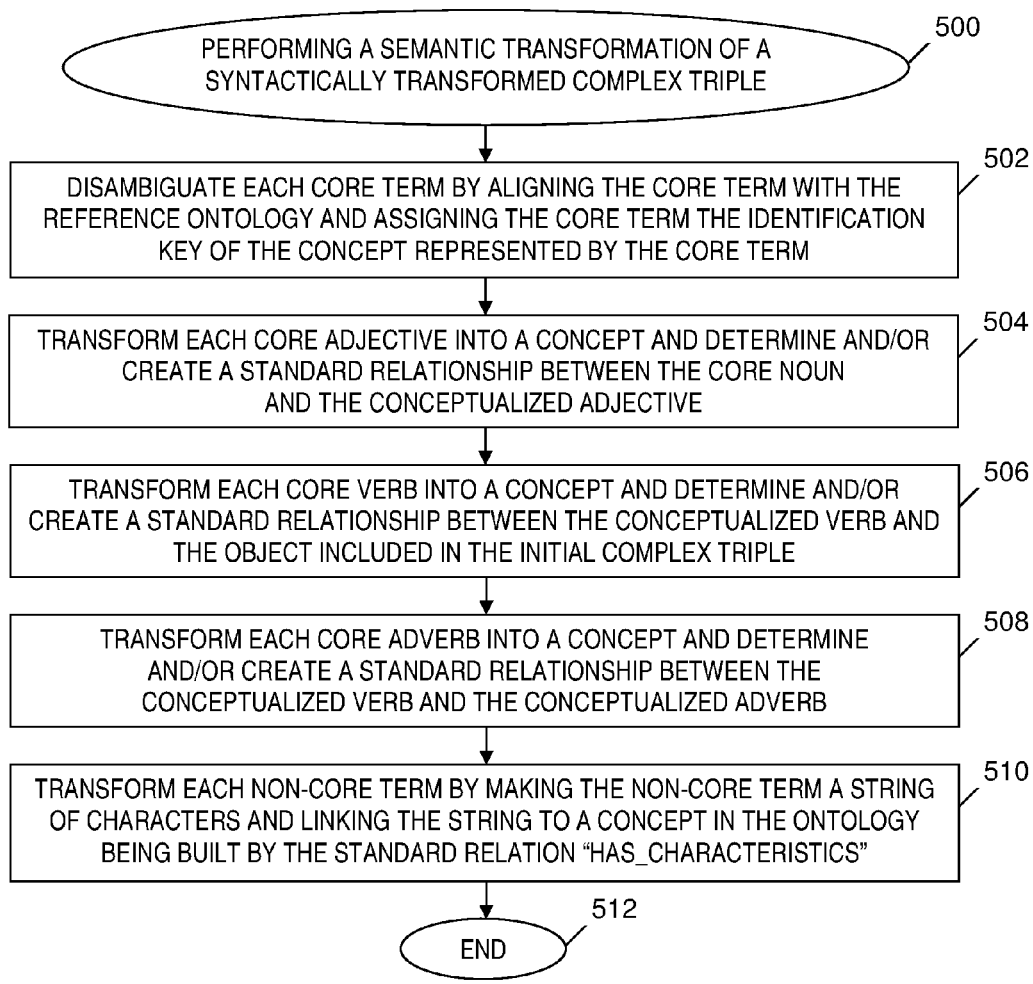
FIG. 5 is a flowchart of a process of semantic transformation of a syntactically transformed complex triple included in the process of FIG. 3, in accordance with embodiments of the present invention.

In one embodiment, step 306 is implemented by the process depicted in FIG. 5.

In step 308, complex triples transformation tool 110 (see FIG. 1) performs an enrichment transformation of the simplified triples resulting from step 306. The enrichment transformation in step 308 includes enriching the ontology being built by adding to the ontology the correspondences of the core terms of the simplified triples with the core terms' definitions obtained from the reference ontology 114 (see FIG. 1). The enrichment transformation in step 308 also includes analyzing the definitions obtained from reference ontology 114 (see FIG. 1) to create additional small schemas that enrich the ontology being built. Complex triples transformation tool 110 (see FIG. 1) performs step 308 by retrieving and applying rules that are stored in ontology meta-schema 116 (see FIG. 1). The enrichment transformation in step 308 creates a new set of complex triples based on the obtained definitions.

Figure 6:
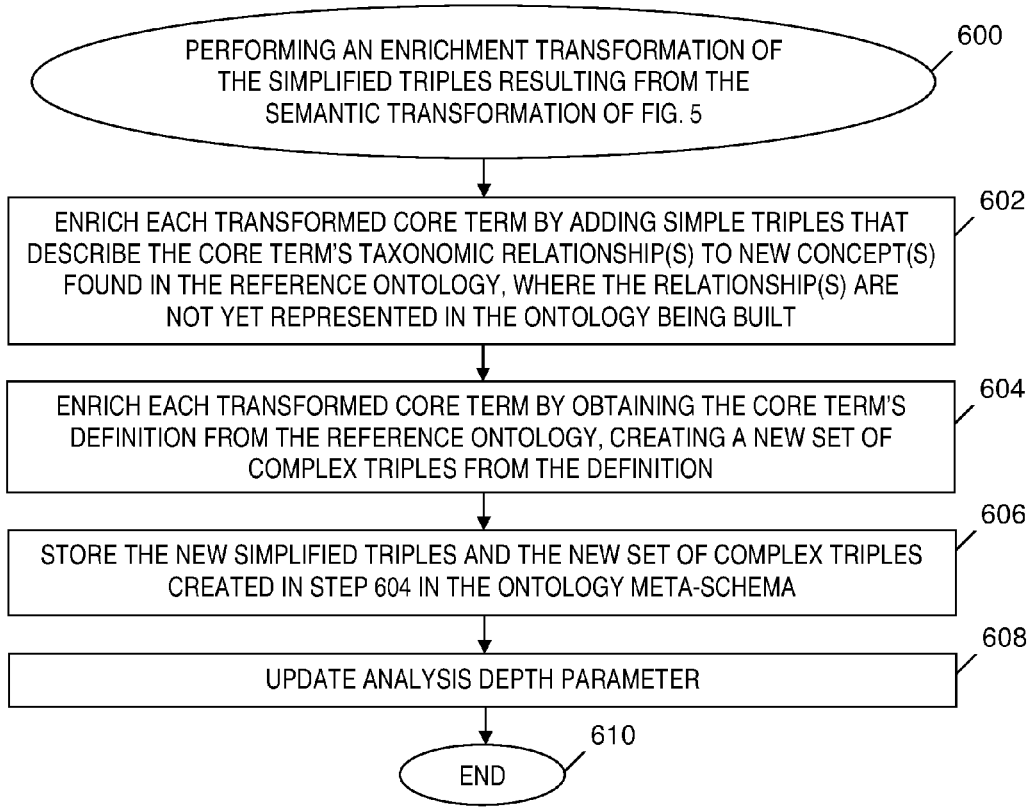
FIG. 6 is a flowchart of a process of enrichment transformation of simplified triples included in the process of FIG. 3, in accordance with embodiments of the present invention.

In one embodiment, step 308 is implemented by the process depicted in FIG. 6.

In step 310, complex triples transformation tool 110 (see FIG. 1) receives the new set of complex triples that was created in step 308. In step 312, complex triples transformation tool 110 (see FIG. 1) repeats steps 304 and 306 to perform syntactic and semantic transformation of each complex triple in the new set of complex triples received in step 310, thereby creating new simplified triples for the obtained definitions (i.e., creating semantic schemas representing respective definitions).

In step 314, complex triples transformation tool 110 (see FIG. 1) determines whether an analysis depth has been reached. If the analysis depth has been reached, then the Yes branch of step 314 is taken and step 316 is performed; otherwise, the No branch of step 314 is taken and the process of FIG. 3 loops back to step 308 with an enrichment transformation of the simplified triples resulting from the most recent performance of step 312. The analysis depth may be received by complex triples transformation tool 110 (see FIG. 1) prior to the first performance of step 314.

In step 316, complex triples transformation tool 110 (see FIG. 1) outputs the simplified and enriched standard triples that result from the syntactic transformation(s) of step 304, the semantic transformation(s) of step 306 and the enrichment transformation(s) of step 308. The process of FIG. 3 ends at step 318.

As one example, complex triples transformation tool 110 (see FIG. 1) receives an analysis depth parameter initialized as the number of desired iterations of the loop starting at step 308. Complex triples transformation tool 110 (see FIG. 1) receives the initialized analysis depth parameter prior to the first performance of step 312. In this example, complex triples transformation tool 110 (see FIG. 1) decrements the analysis depth parameter by one after step 312 and prior to step 314. If complex triples transformation tool 110 (see FIG. 1) determines in step 314 that the decremented analysis depth parameter is less than one, then the analysis depth parameter indicates that the analysis depth has been reached, and the Yes branch of step 314 is taken and step 316 is performed. Otherwise, complex triples transformation tool 110 (see FIG. 1) determines in step 314 that the decremented analysis depth parameter is greater than or equal to one, which indicates that analysis depth has not been reached (i.e., at least one more iteration of the steps in the loop starting at step 308 must be performed), and the No branch of step 314 is taken so that the process loops back to step 308.

It will be apparent to those skilled in the art that the initialization and decrementing of the parameter described above is merely an example, and that another initialization and type of parameter updating may be employed in the process of FIG. 3. As another example, the parameter may be initialized to a value of zero, may be updated by incrementing the parameter by one, and step 314 may determine whether the parameter is greater than or equal to a threshold value that equals the desired number of iterations of the loop starting at step 308.

Although not shown in FIG. 3, the process may include steps (not shown) that prompt a user to view and validate the results of step 304, step 306 and/or step 308 and receive from the user a validation of the results or a modification of the results. Over time, as more ontologies are built by the processes of FIG. 2 and FIG. 3, the ontology building system 100 (see FIG. 1) becomes better tuned with a better grammar 112 (see FIG. 1), better transformation rules in ontology meta-schema 116 (see FIG. 1) and a better set of invented terms, thereby allowing the system to prompt the user only for validation of the results of the transformation steps or to avoid the need to prompt the user at all.

Syntactic Transformation

FIGS. 4A-4F depict a flowchart of a process of syntactic transformation of a complex triple included in the process of FIG. 3, in accordance with embodiments of the present invention. In one embodiment, the process of FIGS. 4A-4F is included in step 304 (see FIG. 3). The process of FIGS. 4A-4F starts at step 400 in FIG. 4A. Prior to step 402, complex triples transformation tool 110 (see FIG. 1) receives one of the complex triples of the multiple complex triples extracted in step 204 (see FIG. 2). Hereinafter, in the discussion of FIGS. 4A-4F, the complex triple received prior to step 402 is referred to simply as "the complex triple." In step 402, based on grammar 112 (see FIG. 1) and reference ontology 114 (see FIG. 1), complex triples transformation tool 110 (see FIG. 1) identifies the compound subject in the complex triple.

In step 404, complex triples transformation tool 110 (see FIG. 1) determines whether the compound subject identified in step 402 is a single term. If complex triples transformation tool 110 (see FIG. 1) determines in step 404 that the identified compound subject is a single term, then the Yes branch of step 404 is taken and step 406 is performed. In step 406, complex triples transformation tool 110 (see FIG. 1) designates the identified compound subject, which is a single term, as a core term and as a noun (i.e., designates the identified compound subject as a core noun).

Returning to step 404, if complex triples transformation tool 110 (see FIG. 1) determines that the identified compound subject is not a single term, then the No branch of step 404 is taken and inquiry step 408 is performed.

If complex triples transformation tool 110 (see FIG. 1) determines in step 408 that the compound subject identified in step 402 includes only one term that can be matched to a noun in the reference ontology 114 (see FIG. 1), then the Yes branch of step 408 is taken and step 410 is performed. In step 410, complex triples transformation tool 110 (see FIG. 1) designates the aforementioned one term in the identified compound subject that can be matched to a noun as a core term and as a noun.

Figure 4A:
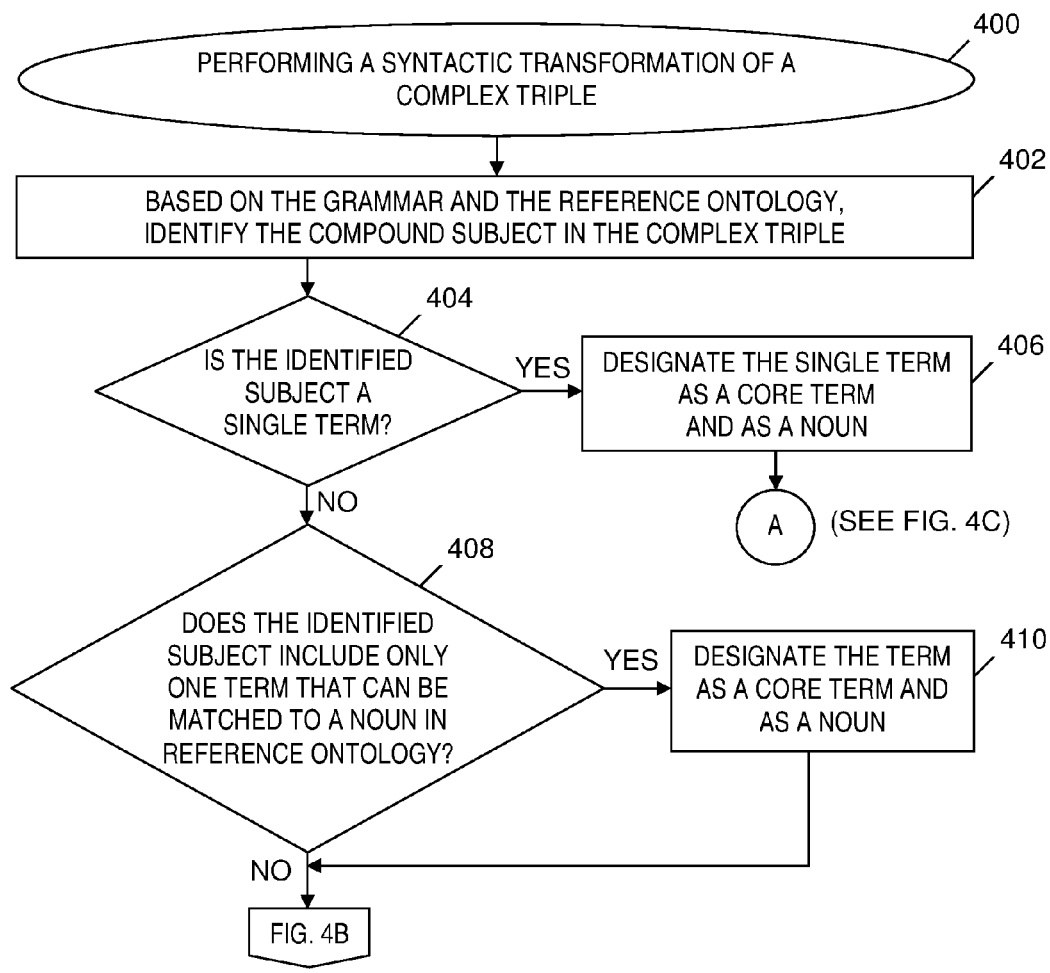
FIGS. 4A-4F depict a flowchart of a process of syntactic transformation of a complex triple included in the process of FIG. 3, in accordance with embodiments of the present invention.
Figure 4B:
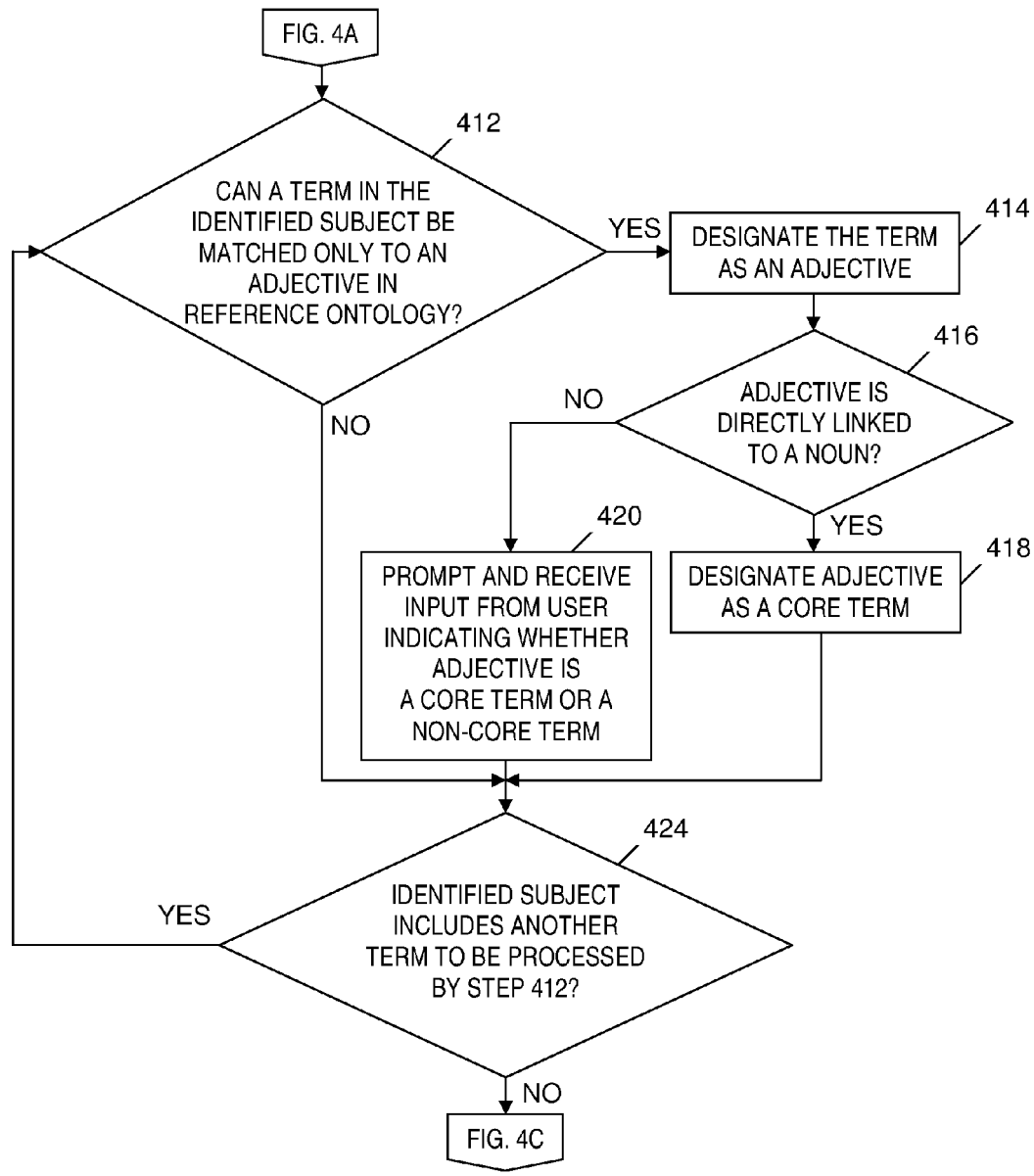

Returning to step 408, if complex triples transformation tool 110 (see FIG. 1) determines that the compound subject identified in step 402 does not include only one term that can be matched to a noun in reference ontology 114 (see FIG. 1), then the No branch of step 408 is taken and step 412 in FIG. 4B is performed. Step 412 (see FIG. 4B) also follows step 410.

In each performance of step 412, complex triples transformation tool 110 (see FIG. 1) processes a respective term in the identified compound subject. Hereinafter, with respect to steps in FIG. 4B, the term being processed by step 412 is referred to as "the current term." In step 412, if complex triples transformation tool 110 (see FIG. 1) determines that the current term in the compound subject identified in step 402 (see FIG. 4A) can be matched only to an adjective in reference ontology 114 (see FIG. 1), then the Yes branch of step 412 is taken and step 414 is performed.

In step 414, complex triples transformation tool 110 (see FIG. 1) designates the current term that can be matched only to an adjective in reference ontology 114 (see FIG. 1) as an adjective. If complex triples transformation tool 110 (see FIG. 1) determines in step 416 that the adjective designated in step 414 is directly linked to a noun, then the Yes branch of step 416 is taken and step 418 performed. In one embodiment, an adjective directly linked to a noun is defined as an adjective that is linked to a noun without any preposition. In step 418, complex triples transformation tool 110 (see FIG. 1) designates the aforementioned adjective as a core term.

Returning to step 416, if complex triples transformation tool 110 (see FIG. 1) determines that the adjective designated in step 414 is not directly linked to a noun, then the No branch of step 416 is taken and step 420 is performed. In step 420, complex triples transformation tool 110 (see FIG. 1) prompts a user of computer system 102-1 (see FIG. 1) and receives input from the user indicating whether the aforementioned adjective is a core term or a non-core term.

Returning to step 412, if complex triples transformation tool 110 (see FIG. 1) determines that the current term in the aforementioned compound subject cannot be matched only to an adjective in reference ontology 114 (see FIG. 1), then the No branch of step 412 is taken and step 424 is performed.

Figure 4C:
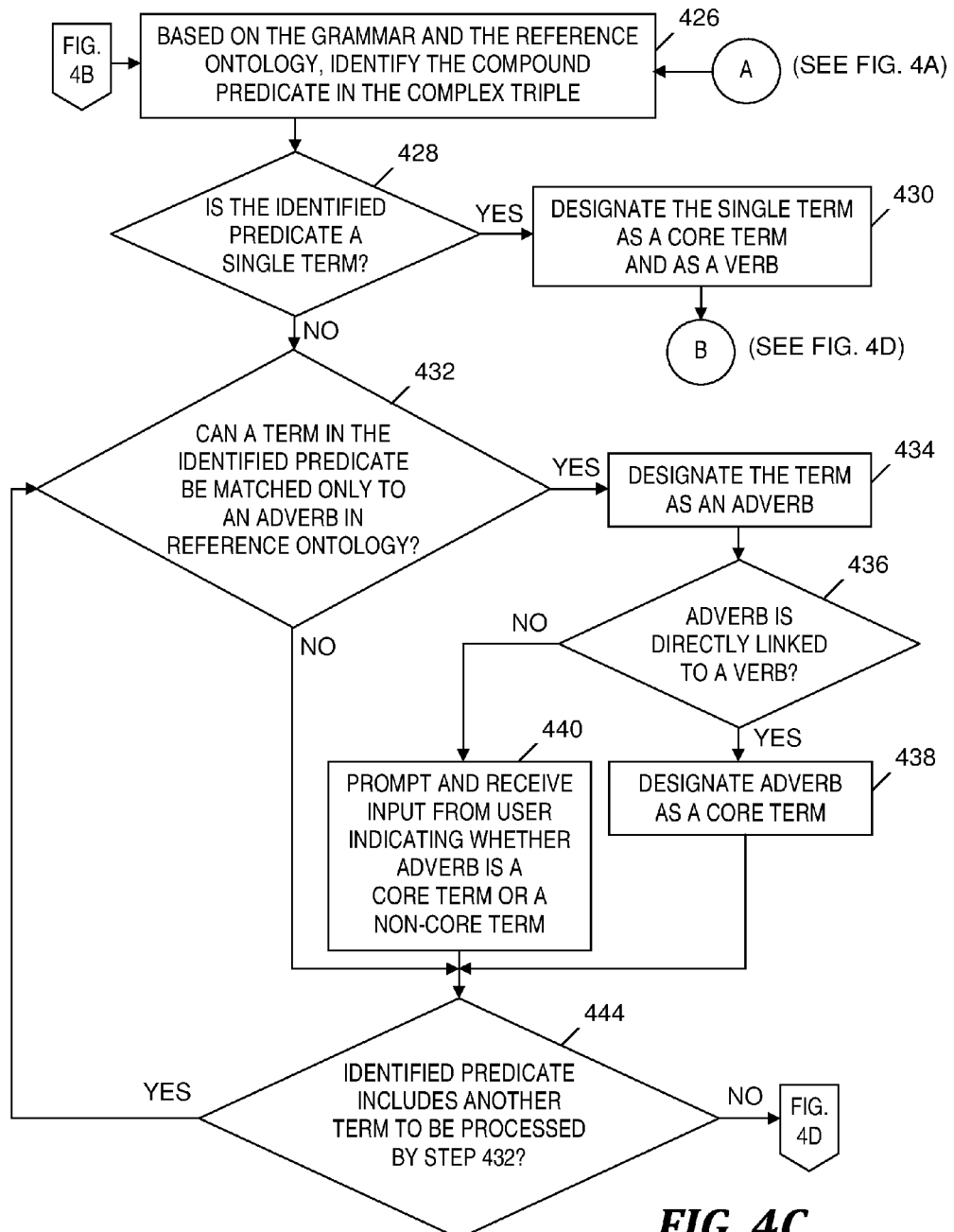

Inquiry step 424 follows the No branch of step 412 and each of steps 418 and 420. If complex triples transformation tool 110 (see FIG. 1) in step 424 determines that the compound subject identified in step 402 (see FIG. 4A) includes another term that has not yet been processed by step 412, then the Yes branch of step 424 is taken and the process loops back to step 412, at which the other term determined to be included in the compound subject by step 424 becomes the new "current term" relative to step 412. Otherwise, if complex triples transformation tool 110 (see FIG. 1) determines in step 424 that the compound subject identified in step 402 (see FIG. 4A) includes no other term to be processed by step 412, then the No branch of step 424 is taken and step 426 in FIG. 4C is performed.

In step 426, which follows the No branch of step 424 (see FIG. 4B) and also follows step 406 (see FIG. 4A), complex triples transformation tool 110 (see FIG. 1) identifies the compound predicate in the complex triple based on grammar 112 (see FIG. 1) and reference ontology 114 (see FIG. 1).

If complex triples transformation tool 110 (see FIG. 1) determines in step 428 that the predicate identified in step 426 is a single term, then the Yes branch of step 428 is taken and step 430 is performed. In step 430, complex triples transformation tool 110 (see FIG. 1) designates the single term predicate as a core term and as a verb.

Returning to step 428, if complex triples transformation tool 110 (see FIG. 1) determines that the predicate identified in step 426 is not a single term, then the No branch of step 428 is taken and inquiry step 432 is performed. In each performance of step 432, complex triples transformation tool 110 (see FIG. 1) processes a respective term in the identified compound predicate. Hereinafter, with respect to step 432 and subsequent steps in FIG. 4C, the term being processed by step 432 is referred to as "the current term."

If complex triples transformation tool 110 (see FIG. 1) determines in step 432 that the current term can be matched only to an adverb in reference ontology 114 (see FIG. 1), then the Yes branch of step 432 is taken and step 434 is performed. In step 434, complex triples transformation tool 110 (see FIG. 1) designates the current term as an adverb.

If complex triples transformation tool 110 (see FIG. 1) determines in step 436 that the adverb designated in step 434 is directly linked to a verb in the compound predicate identified in step 426, then the Yes branch of step 436 is taken and step 438 is performed. In one embodiment, an adverb directly linked to a verb is defined as an adverb that is linked to a verb without any preposition. In step 438, complex triples transformation tool 110 (see FIG. 1) designates the aforementioned adverb as a core term.

Returning to step 436, if complex triples transformation tool 110 (see FIG. 1) determines that the adverb designated in step 434 is not directly linked to a verb in the identified compound predicate, then the No branch of step 436 is taken and step 440 is performed. In step 440, complex triples transformation tool 110 (see FIG. 1) prompts the user and receives input from the user indicating whether the aforementioned adverb is a core term or a non-core term.

Returning to step 432, if complex triples transformation tool 110 (see FIG. 1) determines that the current term cannot be matched only to an adverb in reference ontology 114 (see FIG. 1), then the No branch of step 432 is taken and step 444 is performed.

Inquiry step 444 follows the No branch of step 432 and each of steps 438 and 440. If complex triples transformation tool 110 (see FIG. 1) determines in step 444 that the predicate identified in step 426 includes another term that has not yet been processed by step 432, then the Yes branch of step 444 is taken, and the process loops back to step 432, with the other term determined to be not yet processed by step 432 becoming the "current term" relative to step 432.

Figure 4D:
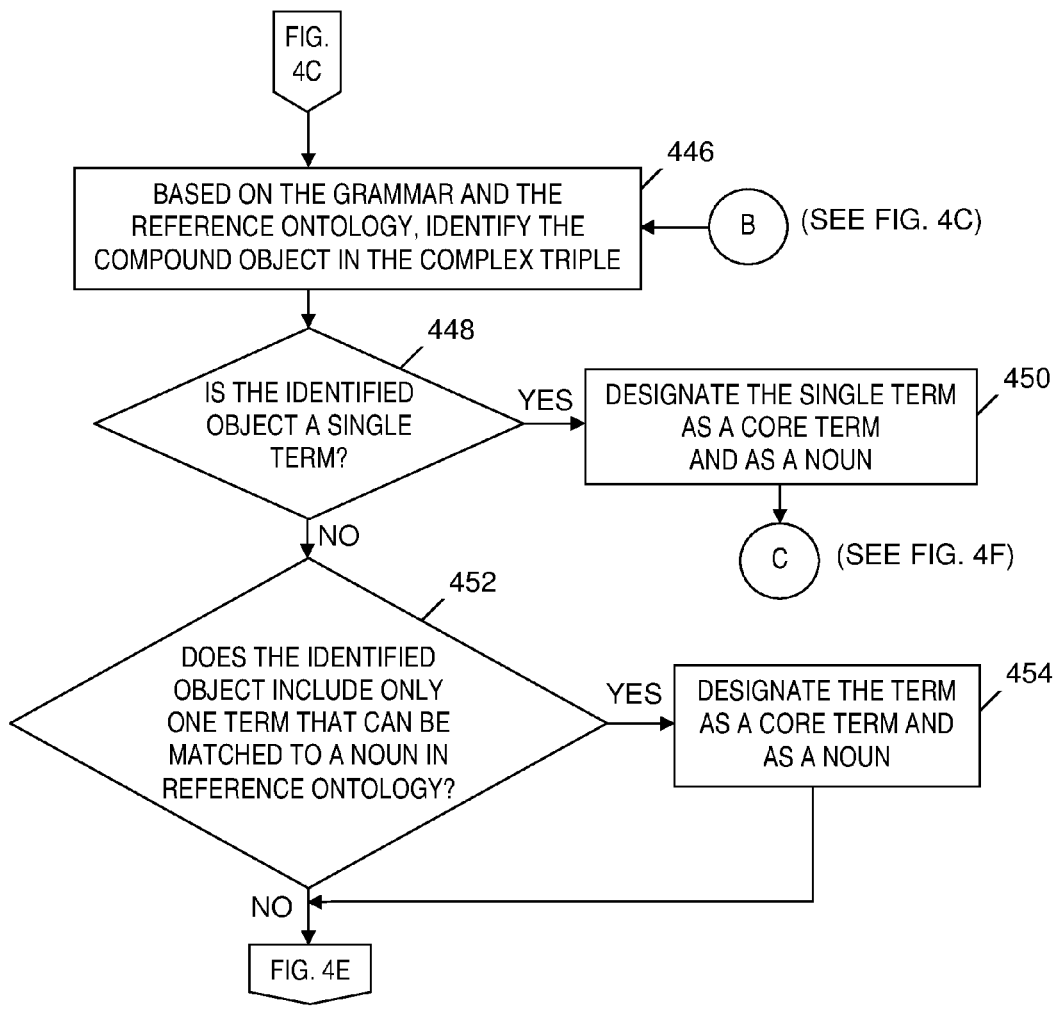

Otherwise, if complex triples transformation tool 110 (see FIG. 1) determines in step 444 that the compound predicate identified in step 426 includes no other term to be processed by step 432, then the No branch of step 444 is taken and step 446 in FIG. 4D is performed.

In step 446 in FIG. 4D, which follows the No branch of step 444 (see FIG. 4C) and also follows step 430 (see FIG. 4C), complex triples transformation tool 110 (see FIG. 1) identifies the compound object in the complex triple based on grammar 112 (see FIG. 1) and reference ontology 114 (see FIG. 1).

In step 448, complex triples transformation tool 110 (see FIG. 1) determines whether the compound object identified in step 446 is a single term. If complex triples transformation tool 110 (see FIG. 1) determines in step 448 that the identified compound object is a single term, then the Yes branch of step 448 is taken and step 450 is performed. In step 450, complex triples transformation tool 110 (see FIG. 1) designates the identified compound object, which is a single term, as a core term and as a noun (i.e., designates the identified compound object as a core noun).

Returning to step 448, if complex triples transformation tool 110 (see FIG. 1) determines that the identified compound object is not a single term, then the No branch of step 448 is taken and inquiry step 452 is performed.

If complex triples transformation tool 110 (see FIG. 1) determines in step 452 that the compound object identified in step 446 includes only one term that can be matched to a noun in the reference ontology 114 (see FIG. 1), then the Yes branch of step 452 is taken and step 454 is performed. In step 454, complex triples transformation tool 110 (see FIG. 1) designates the aforementioned one term in the identified compound object that can be matched to a noun as a core term and as a noun.

Figure 4E:
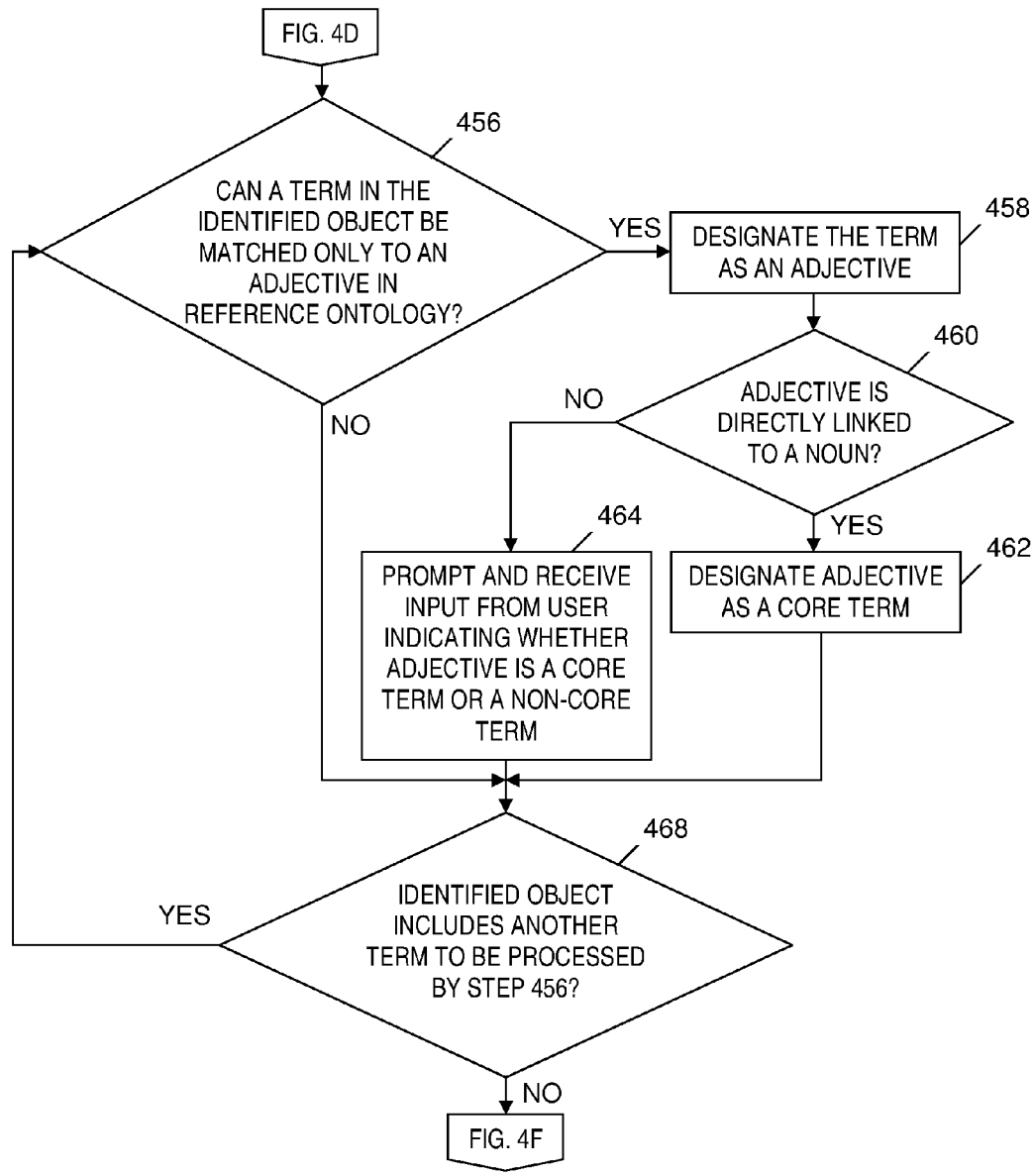

Returning to step 452, if complex triples transformation tool 110 (see FIG. 1) determines that the compound object identified in step 446 does not include only one term that can be matched to a noun in reference ontology 114 (see FIG. 1), then the No branch of step 452 is taken and step 456 in FIG. 4E is performed.

In each performance of step 456, complex triples transformation tool 110 (see FIG. 1) processes a respective term in the identified compound object. Hereinafter, with respect to steps in FIG. 4E, the term being processed by step 456 is referred to as "the current term." In step 456, if complex triples transformation tool 110 (see FIG. 1) determines that the current term in the compound object identified in step 446 (see FIG. 4D) can be matched only to an adjective in reference ontology 114 (see FIG. 1), then the Yes branch of step 456 is taken and step 458 is performed.

In step 458, complex triples transformation tool 110 (see FIG. 1) designates the current term that can be matched only to an adjective in reference ontology 114 (see FIG. 1) as an adjective. If complex triples transformation tool 110 (see FIG. 1) determines in step 460 that the adjective designated in step 458 is directly linked to a noun, then the Yes branch of step 460 is taken and step 462 performed. In step 462, complex triples transformation tool 110 (see FIG. 1) designates the aforementioned adjective designated in step 458 as a core term.

Returning to step 460, if complex triples transformation tool 110 (see FIG. 1) determines that the adjective designated in step 458 is not directly linked to a noun, then the No branch of step 460 is taken and step 464 is performed. In step 464, complex triples transformation tool 110 (see FIG. 1) prompts the user and receives input from the user indicating whether the aforementioned adjective designated in step 458 is a core term or a non-core term.

Returning to step 456, if complex triples transformation tool 110 (see FIG. 1) determines that the current term in the aforementioned compound object cannot be matched only to an adjective in reference ontology 114 (see FIG. 1), then the No branch of step 456 is taken and step 468 is performed.

Figure 4F:
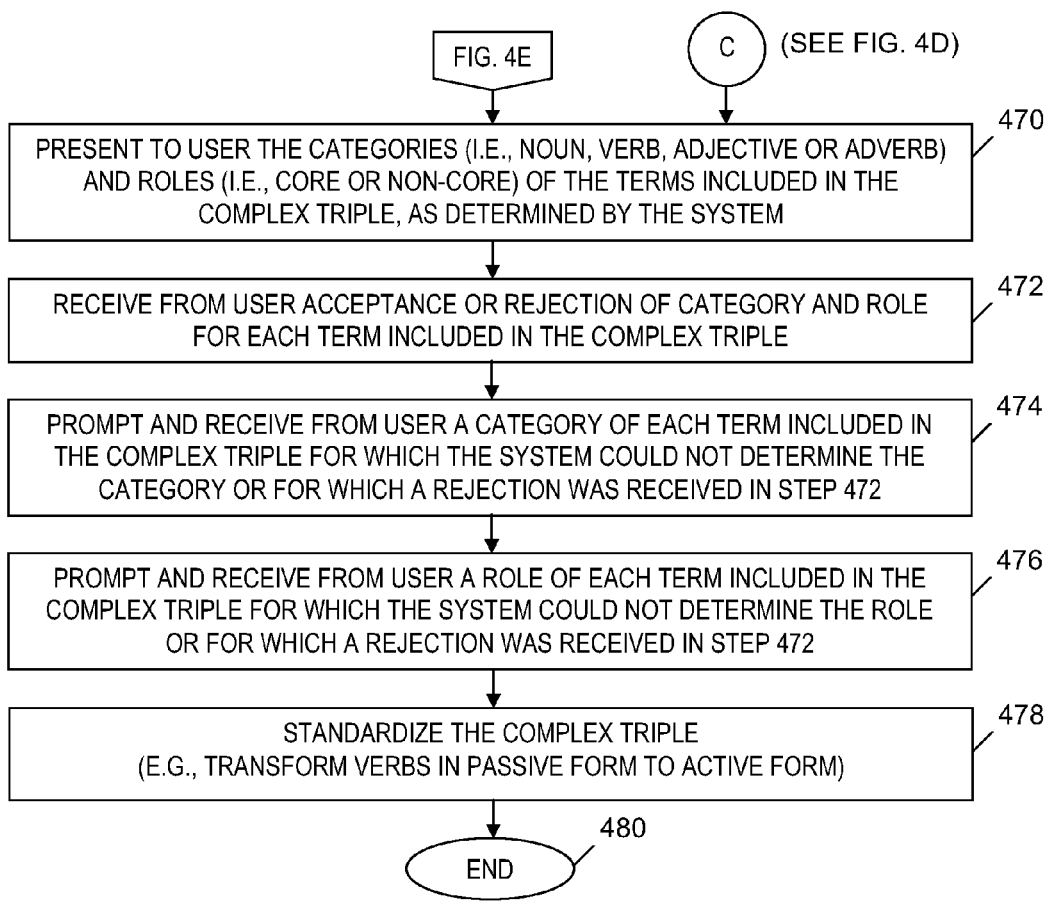

Inquiry step 468 follows the No branch of step 456 and each of steps 462 and 464. If complex triples transformation tool 110 (see FIG. 1) in step 468 determines that the compound object identified in step 446 (see FIG. 4D) includes another term that has not yet been processed by step 456, then the Yes branch of step 468 is taken and the process loops back to step 456, at which the other term determined to be included in the compound object by step 468 becomes the new "current term" relative to step 456. Otherwise, if complex triples transformation tool 110 (see FIG. 1) determines in step 468 that the compound object identified in step 446 (see FIG. 4D) includes no other term to be processed by step 456, then the No branch of step 468 is taken and step 470 in FIG. 4F is performed.

In step 470 complex triples transformation tool 110 (see FIG. 1) presents to the user the categories (i.e., at least the categories of noun, verb, adjective and adverb) and roles (i.e., core term or non-core term) of the terms included in the complex triple, as determined by ontology builder 106 (see FIG. 1) in the previous steps of FIGS. 4A-4E.

In step 472, complex triples transformation tool 110 (see FIG. 1) receives from the user an acceptance or a rejection of the category and role of each term that is included in the complex triple.

In step 474, complex triples transformation tool 110 (see FIG. 1) prompts the user and receives from the user a category of each term included in the complex triple for which the ontology builder 106 (see FIG. 1) could not determine the category in the steps of FIGS. 4A-4E, or for which a rejection was received in step 472.

In step 476, complex triples transformation tool 110 (see FIG. 1) prompts the user and receives from the user a role of each term included in the complex triple for which the ontology builder 106 (see FIG. 1) could not determine the role in the steps of FIGS. 4A-4E, or for which a rejection was received in step 472. Every non-core term must be associated with a core term. In one embodiment, the end user may associate a non-core term with a core term if the aforementioned transformation of the complex triples cannot generate the association between the non-core term and the core term. The association between the non-core term and the core term will be translated into a "has_characteristics" relationship linking the non-core term to the core term, as is discussed below relative to step 510 (see FIG. 5).

In step 478, complex triples transformation tool 110 (see FIG. 1) standardizes the complex triple to facilitate the transformations in steps 306 and 308 in FIG. 3. Examples of rules that standardize complex triples in step 478 include:

Standardize a complex triple that includes a conjunction with the following transformation:
        (subject_1 AND subject_2, predicate, object)
          becomes
        (subject_1, predicate, object)
        (subject_2, predicate, object)
    Standardize a complex triple that includes a passive form of a verb by transforming the passive form into an active form:
        (subject_term, is_predicated, object_term)
          becomes
        (object_term, predicate, subject_term)

For example, complex triples transformation tool 110 (see FIG. 1) transforms a verb that is in a passive form to a verb in an active form, while retaining the semantics of the verb. The process of FIGS. 4A-4F ends at step 480.

Although not shown in FIGS. 4A-4F, other transformation steps may be added to the syntactic transformation process to impose non-null values in the complex triples. For example, if a complex triple does not include an object (e.g., the complex predicate is an intransitive verb), then complex triples transformation tool 110 (see FIG. 1) creates and adds an object. If a complex triple does not include a subject, then complex triples transformation tool 110 (see FIG. 1) creates and adds a subject. If a complex triple includes an attribute describing a subject without an object, then complex triples transformation tool 110 (see FIG. 1) transforms the attribute and the verb. Particular examples of additional transformation steps are presented below:

Example 1: <fish, swim, →becomes:
        <fish, swim, fish-swim>
        <fish-swim, is_a, swim>
    Example 2: <It, froze, →becomes:
        <it, perform, freeze>
    Example 3: <car, is, performant> becomes:
        <car, has, performance>

The syntactic transformation rules specified in the process of FIGS. 4A-4F and the additional rules described above do not constitute an exhaustive list. Regardless of the particular list of syntactic transformation rules, the syntactic transformation performed in step 304 (see FIG. 3) must ensure that the complex triples are compliant with grammar 112 (see FIG. 1), and that the category and role of every term in the complex triples are identified. The semantic transformation (i.e., step 306 in FIG. 3) applies transformation rules that are different from the transformation rules described above relative to FIGS. 4A-4F, and the transformation rules applied by the semantic transformation may depend upon the category and role of the term to be transformed.

In one embodiment, grammar 112 (see FIG. 1) used in the process of FIGS. 4A-4F is a well-defined grammar that specifies: (1) a compound subject as including noun(s) and zero or more adjectives; (2) a compound predicate as including verb(s) and zero or more adverbs; (3) a compound object as including noun(s) and zero or more adjectives; (4) a noun as including a core term and zero or more non-core terms; (4) a verb as including a core term and zero or more non-core terms; (5) an adverb as including a core term and zero or more non-core terms; and (6) an adjective as including a core term and zero or more non-core terms. In the embodiment described in this paragraph, the grammar 112 (see FIG. 1) allows the process of FIGS. 4A-4F to identify core nouns, verbs, adjectives and adverbs. Those skilled in the art will realize that the present invention can use another grammar, or the grammar may be adapted based on an analysis of the ontologies built by ontology builder 106 (see FIG. 1) over time, but the grammar that is used must allow at least the identification of nouns, verbs, adjectives and adverbs. If other word categories are considered important (e.g., prepositions) relative to semantics, then the grammar must also represent the other word categories. In one embodiment, the grammar 112 (see FIG. 1) evolves over time, making the ontology builder 106 (see FIG. 1) more effective over time. For example, a first version of grammar 112 (see FIG. 1) may identify only nouns, verbs, adjectives and adverbs, while a subsequent version may also identify prepositions.

Semantic Transformation

FIG. 5 is a flowchart of a process of semantic transformation of a syntactically transformed complex triple included in the process of FIG. 3, in accordance with embodiments of the present invention. In one embodiment, the process of FIG. 5 is included in step 306 (see FIG. 3). The process of semantic transformation begins at step 500. In step 502, complex triples transformation tool 110 (see FIG. 1) disambiguates each core term in the complex triples that result from the syntactic transformation performed in step 304 (see FIG. 3) (i.e., the syntactically transformed complex triples). In one embodiment, step 502 includes performing word-sense disambiguation, which includes identifying which sense of a word (i.e., meaning) is used in a sentence. Disambiguating a core term in step 502 includes aligning the core term with the reference ontology 114 (see FIG. 1) and assigning to the core term an identification key of the concept represented by the core term, where the identification key is associated with the concept in reference ontology 114 (see FIG. 1). To disambiguate the core terms in step 502, complex triples transformation tool 110 (see FIG. 1) may utilize a software-based disambiguation tool (e.g., the SenseRelate algorithm) to locate definitions of the core terms and identification keys found in the WordNet® lexical database, and propose the definitions and keys to a user for validation. The SenseRelate algorithm performs word sense disambiguation by using measures of semantic similarity and relatedness. The SenseRelate algorithm was developed at the University of Minnesota, Duluth, and is distributed by SourceForge®, located in Mountain View, Calif. SourceForge is a registered trademark owned by Geeknet, Inc., located in Fairfax, Va. The WordNet® lexical database was created and is maintained by Princeton University. WordNet is a registered trademark owned by Trustees of Princeton University, located in Princeton, N.J.

In step 504, complex triples transformation tool 110 (see FIG. 1) transforms each adjective into a concept (i.e., a conceptualized adjective; also known as a nounified adjective). Each adjective transformed in step 504 is a core term in the syntactically transformed complex triples, and is linked to a core noun in the syntactically transformed complex triples. Step 504 also includes complex triples transformation tool 110 (see FIG. 1) determining and/or creating a standard relationship between the aforementioned core noun and the conceptualized adjective.

In step 506, complex triples transformation tool 110 (see FIG. 1) transforms each verb into a concept (i.e., a conceptualized verb; also known as a nounified verb). Each verb transformed in step 506 is a core term in the syntactically transformed complex triples, and is linked to an object in the syntactically transformed complex triples. Step 506 also includes complex triples transformation tool 110 (see FIG. 1) determining and/or creating a standard relationship between the conceptualized verb and the aforementioned object.

In step 508, complex triples transformation tool 110 (see FIG. 1) transforms each adverb into a concept (i.e., a conceptualized adverb; also known as a nounified adverb). Each adverb transformed in step 508 is a core term in the syntactically transformed complex triples, and is linked to a core verb in the syntactically transformed complex triples. Step 508 also includes complex triples transformation tool 110 (see FIG. 1) determining and/or creating a standard relationship between the conceptualized adverb and the conceptualized verb into which step 506 transforms the aforementioned core verb.

In step 510, complex triples transformation tool 110 (see FIG. 1) transforms each non-core term in the syntactically transformed complex triples by making the non-core term a string of characters and using the standard relationship "has_characteristics" to link the string to a concept in the ontology being built by the process of FIG. 2. The non-core terms are not aligned with the reference ontology 114 (see FIG. 1), and their transformation in step 510 does not require any user interaction.

The process of FIG. 5 ends at step 512. The process of FIG. 5 is repeated to perform a semantic transformation of every other syntactically transformed complex triple.

One or more steps (not shown) may be added to the process of FIG. 5 to transform other types of terms in grammar 112 (see FIG. 1) into concepts.

In one embodiment, at least the standard relationships of "has_value", "has_attribute", "is_attribute", "has_property", and "is_a" must be used in one or more of steps 504, 506 and 508, as illustrated in examples presented below. Depending on the types of terms that conceptualized in the process of FIG. 5, additional standard relationships may be required.

Complex triples transformation tool 110 (see FIG. 1) assigns each new concept generated by the process of FIG. 5 a unique identification key from reference ontology 114 (see FIG. 1) or from the set of invented terms. Each new concept takes on the role of subject, predicate or object in one of the simple triples resulting from step 306 in FIG. 3.

The process of FIG. 5 requires knowledge of the structure of reference ontology 114, because the transformations in steps 504, 506, and 508 require a search in the reference ontology for the concepts that are semantically linked to the adjectives, verbs and adverbs being transformed. Complex triples transformation tool 110 (see FIG. 1) may retrieve knowledge of the structure of reference ontology 114 (see FIG. 1) by retrieving the meta-schema of the reference ontology from ontology meta-schema 116 (see FIG. 1).

Although not shown in FIG. 5, one or more additional steps may include complex triples transformation tool 110 (see FIG. 1) prompting a user to validate the concepts formed by steps 504, 506 and 508, and receiving validations of the concepts from the user. Alternately, complex triples transformation tool 110 (see FIG. 1) may prompt the user to select concepts into which the adjectives, verbs and adverbs are transformed, where the user selects from potential concepts in reference ontology 114 (see FIG. 1).

Example of Semantic Transformation of a Core Adjective

The semantic transformation of FIG. 5 transforms every core adjective into an attribute, where the attribute is associated to an existing noun of the schema by the standard relation "has_attribute". The core adjective itself (i.e., the adjective prior to its semantic transformation) becomes a value of the attribute, through the "has_value" relation.

The general pattern for semantically transforming a core adjective includes:
(term1, predicate, adjective+term2)
  must become:
(term1, predicate, term2)
(term2, has_attribute, adjective_related noun)
adjective_related noun.has_value=value The "adjective_related noun" is a noun related to the adjective associated with term2. The general pattern presented above for semantically transforming a core adjective is simplified for illustration purposes; the exact pattern is given in the algorithm described in the section entitled "Semantic Transformation and Alignment with the Reference Ontology."

As one example of semantically transforming a core adjective, consider that the WordNet® lexical database is reference ontology 114 (see FIG. 1), and consider the following triple:
(body, is_streamlined_with, low drag)

The syntactic transformation transforms the predicate into an active form:
(low drag, streamline, body)

The syntactic transformation identifies in the WordNet® lexical database that "drag" is not an adjective and therefore determines that "low" is the adjective (or the ontology builder 106 (see FIG. 1) may directly ask the end user what must be considered as an adjective or a noun). After searching for the term in the WordNet® lexical database, the end user selects the following definition for the adjective "low":
less than normal in degree or intensity or amount; "low prices"; "the reservoir is low".

The semantic transformation algorithm checks if the adjective is related to an "attribute" in the WordNet® lexical database. In the case of the adjective "low", the check reveals that "low" is related to the attribute "degree":
a position on a scale of intensity or amount or quality; "a moderate grade of intelligence"; "a high level of care is required"; "it is all a matter of degree"

If the adjective has no attribute in the WordNet® lexical database, other nouns are searched in the "derivationally related form" set in the WordNet® lexical database. In the case of the adjective "low," "lowness" is found in the "derivationally related form" set:
a low or small degree of any quality (amount or force or temperature etc.); "he took advantage of the lowness of interest rates".

"Lowness" could be used as an attribute for "low" if a real attribute for "low" had not been existing in the WordNet® lexical database).

In case no noun is available in the WordNet® lexical database to represent the attribute, the noun will be invented by the semantic transformation algorithm by adding the suffix '_ness' to the adjective. The newly invented word will not be mapped in the WordNet® lexical database, but it could be used in other schemas, because the reason and the way it is created are well controlled.

Returning to the example, the initial triple becomes:
(drag, streamline, body)
(drag, has_attribute, degree)
degree.has_value='low'
with the terms "drag", "body", and "degree" being uniquely identified by keys in the WordNet® lexical database.

In a second example of semantically transforming a core adjective, consider the triple:
(aerodynamic design, streamlined, body)

After finding that "design" is not an adjective in the WordNet® lexical database, the semantic transformation algorithm considers "aerodynamic" as the adjective:
aerodynamic: designed or arranged to offer the least resistant to fluid flow The semantic transformation algorithm searches to determine if the adjective "aerodynamic" is linked to an attribute in the WordNet® lexical database. After finding that "aerodynamic" is not linked to an attribute, and after finding that there is no similar WordNet® term in the WN-set (i.e., the set of associated WordNet® terms) of "aerodynamic" that represents a noun, the semantic transformation algorithm creates the new term "aerodynamic_ness", which is used for the ontology being built and is stored in the ontology meta-schema 116 (see FIG. 1) for future re-use by other ontologies being subsequently built. The character "_" in the newly created term is important as it allows the semantic transformation algorithm to see that the term is created, and to trace back from the newly created term to find the initial term.

After searching for the definition of "design" in the WordNet® lexical database, the semantic transformation algorithm selects the following:
the act of working out the form of something (as by making a sketch or outline or plan); "he contributed to the design of a new instrument".

The semantic transformation algorithm transforms the initial triple into:
(design, streamlined, body)
(design, has_attribute, aerodynamic_ness)
aerodynamic_ness.has_value='high'

The value (i.e., 'high') of "aerodynamic_ness" may be given by the end user on request of the semantic transformation algorithm. Alternately, if the semantic transformation algorithm must provide a value, the value may be set to 'yes', with the possible default values of the created attribute limited to 'yes' and 'no'. Any other value is possible, but must be provided by the end user.

The new term "aerodynamic_ness" may be defined as "the attribute of being aerodynamic". The definition of the new term can therefore be stored as:
(aerodynamic_ness, is_attribute, aerodynamic)
(design, has_attribute, aerodynamic_ness)

As the new term is subsequently used over time, the above-mentioned definition can be enriched.

Example of Semantic Transformation of a Core Verb

The semantic transformation of FIG. 5 transforms each predicate by replacing each core verb with a noun in the following pattern:
(term1, predicate, term2)
  must become:
(term1, predicate, verb_related noun)
(verb_related noun, has_property, term2)

The general pattern presented above for semantically transforming a core verb is simplified for illustration purposes; the exact pattern is given in the algorithm described in the section entitled "Semantic Transformation and Alignment with the Reference Ontology."

As an example, consider the following triple:
(car, move, road)

The semantic transformation algorithm transforms the triple so that it becomes:
(car, move, movement)
(movement, has_property, road)

Example of Semantic Transformation of a Core Adverb

The semantic transformation process of FIG. 5 transforms a core adverb by replacing the core verb and the core adverb with nouns according the following pattern:

(term1, predicate+adverb, term2)

must become:

(term1, predicate, verb_related noun)
(verb_related noun, has_property, term2)
(verb_related noun, has_attribute, adverb_related noun)
adverb_related noun.value=value given by the end-user The general pattern presented above for semantically transforming a core adverb is simplified for illustration purposes; the exact pattern is given in the algorithm described in the section entitled "Semantic Transformation and Alignment with the Reference Ontology."

As an example, consider the predicate and adverb in the following triple:

(car, consumes_with_efficiency, fuel)

The semantic transformation algorithm searches the WordNet® lexical database and discovers that "consume" is a verb and not an adverb. Among the possible definitions of "consume" in the WordNet® lexical database, the end user selects the one presented below:

use up (resources or materials); "this car consumes a lot of gas"; "We exhausted our savings"; "They run through 20 bottles each week".

The semantic transformation algorithm then associates the verb "consume" to a noun in the WordNet® lexical database (i.e., the "verb_related noun" mentioned in the pattern presented above). The semantic transformation algorithm searches for nouns that are lexically derived from the verb (i.e., nouns that are in the set of "derivationally related form" and "See Also" terms of the verb "consume"). The end user is asked by ontology builder 106 (see FIG. 1) to select the most relevant term. In this example, the end user selects "depletion", which has the following definition:

the act of decreasing something markedly

The semantic transformation algorithm then considers "efficiency" as an adverb because the first word "consumes" is a verb. Alternately, the ontology builder 106 (see FIG. 1) may ask the end user what terms in the compound predicate must be considered as a verb and adverb.

The semantic transformation algorithm searches for the associated nouns in the WordNet® lexical database to find the "adverb related noun" mentioned in the pattern presented above.

The search of "efficiency" as an adverb in the WordNet® lexical database will be unsuccessful. The semantic transformation algorithm therefore searches for a definition among the nouns in the WordNet® lexical database. In this example, the semantic transformation algorithm selects the following definition for "efficiency":

skillfulness in avoiding wasted time and effort; "she did the work with great efficiency".

It should be noted that if the predicate had been "consumes efficiently", the semantic transformation algorithm would have been the same (i.e., searching for words in the WordNet® lexical database that are associated with "efficiently") and would have found the same definition of "efficiency" as indicated above, but the algorithm would pass through the adjective "efficient". In the WordNet® lexical database, all adjectives from which an adverb is derived are included in the WN-set of the adverb, as indicated in the example below:

efficiently, with efficiency; in an efficient manner; "he functions efficiently" "efficiently" has the adjective "efficient" in its pertainym set:

efficient, being effective without wasting time or effort or expense; "an efficient production manager"; "efficient engines save gas"

"efficient" has the noun "efficiency" as one of its "derivationally related form":

efficiency, skillfulness in avoiding wasted time and effort; "she did the work with great efficiency".

After the semantic transformation algorithm identifies the "adverb_related noun", the ontology builder 106 (see FIG. 1) asks the end user to assign a value to the adverb_related noun.

It should be noted that the end user might not be satisfied with any of the noun definitions proposed by the semantic transformation algorithm. In that case, the semantic transformation algorithm proposes the definitions in the full list of hyponyms, hypernyms or sister terms related to the nouns. In this example, the end user is not be satisfied with the noun "depletion", and instead selects its hyponym "consumption", which has the following definition:

the act of consuming something

If the end user does not see any relevant definition, the semantic transformation algorithm invents a term to represent the concept requested by the end user.

After the semantic transformation in the process of FIG. 5, the initial triple becomes:

(car, consumes, consumption)
(consumption, has_property, fuel)
(consumption, has_attribute, efficiency)
efficiency.has_value=value given by the end-user,
with each of the terms "consumption", "consume", "efficiency" having a unique identification key in the WordNet® lexical database.

Example of Semantic Transformation of a Core Preposition

For this example, suppose that the grammar 112 (see FIG. 1) discriminated prepositions from other terms so that prepositions can be transformed. When related to a verb, the semantic transformation algorithm researches an adverb in the reference ontology 114 (see FIG. 1).

As one example, consider the following triple:

(fish, move through, water)

When considered as an adverb, the semantic transformation algorithm gives the term "through" the following definition:

(adv) through (over the whole distance)

Like all other prepositions in the WordNet® lexical database, the definition of "through" presented above is not related to any other noun in the WordNet® lexical database. The ontology builder 106 (see FIG. 1) extracts the term "distance" to represent the conceptualized adverb, as shown in the example presented below:

(fish, move through, water)

is transformed into:

(fish, move, motion)
(motion, has_property, water)
(motion, has_property, distance)
distance.has_value='unknown'

Example of Semantic Transformation of a Non-Core Term

Complex triples contain non-core terms identified during the syntactic transformation in the process of FIGS. 4A-4F. An adjective, a verb or an adverb may have non-core terms. A noun may have one or more subordinate clauses, where each subordinate clause is a non-core term.

The non-core terms are characteristics of a noun. The semantic transformation algorithm annotates non-core terms associated with an adjective as characteristic of the noun to which the attribute relates. As an example of a characteristic to be associated with an attribute, consider the following:

(ecologically aerodynamic design, streamline, body)
would become
(design, streamline, body)
(design, has_attribute, aerodynamic_ness)
aerodynamic_ness.has_value='high'
aerodynamic_ness.has_characteristic='ecologically'

As an example of transforming a clause associated with a noun, consider the following:
(car with 4 wheels, has_a, consumption)
which becomes
(car, has_a, consumption)
car.has_characteristic='with 4 wheels'

As an example of a non-core term related to an adverb, consider the following:
(car, consume with good efficiency, fuel)

The semantic transformation algorithm annotates the non-core term "good" as a characteristic of "efficiency", which is represented with:
efficiency.has_characteristic='good'

As an example of a non-core term related to a verb, consider:
(car, consumes_with_efficiency every week-end, fuel)
which becomes
(car, consumes, consumption)
(consumption, has_property, fuel)
(consumption, has_attribute, efficiency)
efficiency.has_value=value given by the end-user
consumption.has_characteristic='every week-end'

As shown above, the semantic transformation algorithm transforms a non-core term into a raw characteristic of a noun and does not assign any definition in the WordNet® lexical database.

The semantic transformation algorithm stores characteristics in the ontology meta-schema 116 (see FIG. 1) for further analysis by a knowledge engineer to identify recurrent structure that could be described in an updated version of the grammar 112 (see FIG. 1).

For instance, another version of the grammar 112 (see FIG. 1) may handle compound adverbs made of multiple terms by considering the adjectives. In the example presented above, the semantic transformation algorithm may consider "good" as an adjective of the noun representing the adverb (i.e. an adjective of "efficiency"). The semantic transformation algorithm then considers the adjective "good" as a value of the attribute "quality", as shown in the example presented below:
(efficiency, has_attribute, quality)
quality.has_value='good'

Example of Semantic Correspondences in the Reference Ontology

In this example, consider that the reference ontology 114 (see FIG. 1) is the WordNet® lexical database. For every definition in the WordNet® lexical database selected in the transformation processes (e.g., the processes depicted in FIG. 2, FIG. 3, FIGS. 4A-4F, FIG. 5, and FIG. 6) and the transformation examples presented above, the following steps must be performed in sequence by ontology builder 106 (see FIG. 1):

Step 1: If the term selected from the WordNet® lexical database has many synonyms, then assign the first term in the synset in the WordNet® lexical database to the concept provided in the triple.

For example, the term "automobile" has the following ordered list of synonyms: car, auto, automobile, machine, motorcar:
car, auto, automobile, machine, motorcar (a motor vehicle with four wheels; usually propelled by an internal combustion engine)

In this case, the term "car" must be used instead of "automobile".

Step 2: After a WordNet® lexical database term is assigned to the concept (or relation), store the term in the semantic schema (i.e., the ontology being built) as the standard term representing the concept (or relation). Moreover, retrieve and store all of the term's associated WordNet® lexical database terms (i.e., synonyms, sister terms, etc. . . . ) as correspondences to the concept. These retrieved terms are related to the concept and may be used as matching terms with other ontology schemas. The correspondences to the concept must be stored with the type of relation the correspondences have with the term (e.g., synonym, hyponym, etc.).

Step 3: In the WordNet® lexical database, find the following correspondences to be stored:
for a verb: the related groups, troponyms, and the hierarchy of entailments and hypernyms
for a noun: the synonyms (i.e., terms from the synset in the WordNet® lexical database), the related hierarchy of holonyms and meronyms along with their type (i.e., part, substance or member), the hierarchy of hyponyms, and the hierarchy of the hypernyms
if the noun is built from an adjective, the noun is also assigned an indication whether the noun is an attribute, the original term representing the adjective from which the noun was built, and all possible satellite adjectives
if the noun is built from an adverb, the noun is also assigned the original term representing the adverb or adjective from which the noun was built, and all possible satellite adjectives
if the term is created, the created term is annotated with the WordNet® lexical database terms associated with the root term used to create the created term
for a concept: derivationally related forms, sister terms, hypernyms, hyponyms, holonyms, meronyms For instance, the predicate "streamlined", which is associated with WordNet® lexical database definition 201689899, will be in correspondence with "contour" (as a direct hypernym), "outline", "draw", "interpret", "re-create", "make" (as different levels of hypernyms), and "streamliner" (as a derivationally related form). The aforementioned correspondences of "streamlined" are represented by:
(streamline, has_hypernym_1, contour)
(streamline, has_hypernym_2, outline)
. . .
(streamline, has_derivation, streamliner)

Step 4: If the term is created (e.g. "aerodynamic_ness"), the created term must be in relation with the root term from which the created term was created (e.g., via the "standard relation" is_attribute), and in relation with terms in the WordNet® lexical database that are associated with the root term. In the example presented above that created "aerodynamic_ness", the root term is the adjective "aerodynamic." The aforementioned relations of the created term aerodynamic_ness are represented by:
(aerodynamic_ness, is_attribute, aerodynamic)
(aerodynamic, is_similar, smooth)
(aerodynamic, has_similar=rough)

Example of Semantic Analysis of a Reference Ontology Definition

Beside definitions of the terms, the reference ontology 114 (see FIG. 1) can be used for the semantics it provides in each definition. In the case of the WordNet® lexical database, the definitions are short and involve only a few concepts that can be linked to other definitions in the WordNet® lexical database.

It is advantageous to extract the semantic schema of every WordNet® lexical database definition used in the ontology schema, after the semantic alignment is performed (i.e., after the definitions are identified). These semantic schemas introduce new relevant concepts and relationships that can potentially be used in determining associations between ontologies. The creation of the semantic schema of a term definition can be done by an existing Text Analyzer, but must take in account the terms given in the definition, and their similarity with other related terms (i.e., terms related through synonyms, hypernyms, etc.).

For instance, the term "drag" which has the definition "the phenomenon of resistance to motion through a fluid," and which has "resistance" as one hypernym, may be schematized into:
(drag, is_a, phenomenon)
(phenomenon, resist, fluid)
(motion, has_property, fluid)

The example presented above for semantic analysis of a reference ontology definition is simplified for illustration purposes; the exact transformation must be in accordance with the algorithm described in the section entitled "Semantic Transformation and Alignment with the Reference Ontology," which would provide the following result:
(drag, is_a, drag-phenomenon)
(drag-phenomenon, is_a, phenomenon)
(drag-phenomenon, resist, fluid+motion)
(fluid+motion, is_a, motion)
(fluid+motion, has_property, fluid+motion-fluid)
(fluid+motion-fluid, is_a, fluid)
fluid+motion-fluid.value=unknown
fluid.value=unknown The semantic analysis of the WordNet® lexical database definitions concerns concepts as well as relations. For every new concept or relation introduced in the schema by the definition semantics, the alignment step (i.e., syntactic and semantic transformation) must be performed by the ontology builder 106 (see FIG. 1).

More generally, the creation of a semantic schema for every WordNet® lexical database definition is helpful for the inventive system described herein and for the Semantic Web in general. The ontology builder 106 (see FIG. 1) may automatically produce the aforementioned semantic schemas, which may be validated before becoming the official semantic schema of the term.

After a definition in the WordNet® lexical database is schematized for a specific ontology, the ontology builder 106 (see FIG. 1) stores the definition's schema in the ontology meta-schema 116 (see FIG. 1) for future possible re-use in other ontologies.

Semantic Transformation and Alignment with the Reference Ontology

In the semantic transformation (see step 306 in FIG. 3 and see FIG. 5), ontology builder 106 (see FIG. 1) transforms every triple according to a standard pattern, and aligns every triple with the WordNet® lexical database, as described in this section.

Directly Align Core Term that Represents Noun or Verb:

The core terms that represent a noun or a verb are directly (i.e., without transformation) aligned to the WordNet® lexical database. In one embodiment, the end user is prompted by ontology builder 106 (see FIG. 1) to select the right WordNet® lexical database definition from among a set of definitions proposed by the ontology builder 106 (see FIG. 1). The level of interaction between the end user and the ontology builder 106 (see FIG. 1) may depend on the value of the parameter "automation level".

When the end-user is not satisfied with any of the proposed noun or verb definitions, the semantic transformation algorithm proposes the definitions in the full list of hyponyms, hypernyms or sister terms related to the nouns, or proposes the definitions in the full list of entailments, troponyms, hypernyms and groups related to the verb.

Although it is unlikely, in the case in which no relevant definitions can be found in the WordNet® lexical database, the ontology builder 106 (see FIG. 1) keeps the term and considers it as an "invented term", with its own key.

Transform Core Term of Predicate:

The core terms of predicates are transformed according to the following pattern:
<subject_term, predicate_term, object_term>
becomes the following set:
<subject_term, predicate_term, subject_term-nounified_predicate>
<subject_term-nounified_predicate, is_a, nounified_predicate>
<subject_term-nounified_predicate, has_property, object_t erm>

One example of the pattern presented above for transforming a core term of a predicate is the following:
<car, move, road>
becomes:
<car, move, car-movement>
<car-movement, is_a, movement>
<car-movement, has_property, road>

Transform Core Term of an Adverb:

The core terms of adverbs are transformed according to the following pattern:
<subject_term, predicate_term adverb_term, object_term>
becomes the following set:
<subject_term, predicate_term, subject_term+object_term-nounified_predicate>
<subject_term+object_term-nounified_predicate, is_a, nounified_predicate>
<subject_term+object_term-nounified_predicate, has_property, object_term>

If the adverb is linked to an adjective that has an attribute, then the adverb is transformed according to the following pattern:
<subject_term+object_term-nounified_predicate-nounified_adverb, is_a, nounified_adverb>
<subject_term+object_term-nounified_predicate, has_attribute, subject_term+object_term-nounified_predicate-nounified_adverb>
subject_term+object_term-nounified_predicate-nounified_adverb.has_value=linked adjective If the adverb is actually a noun, then the concept represented by the noun must be represented, and the assignment in the pattern presented above for an adverb linked to an adjective that has an attribute must become a triple in the transformation of the adverb, as shown by the following pattern:
<subject_term+object_term-nounified_predicate-nounified_adverb, has_value, linked adjective>

If the adverb is not linked to an attribute, then the transformation of the adverb follows the pattern presented below:
<subject_term+object_term-nounified_predicate-nounified_adverb, is_a, nounified_adverb>

<subject_term+object_term-nounified_predicate, has_property, subject_term+object_term-nounified_predicate-nounified_adverb>
subject_term+object_term-nounified_predicate-nounified_adverb.value=default value or value provided by the end-user The default value assigned to a "nounified_adverb" by the ontology builder 106 (see FIG. 1) is:

"yes" if the term representing (i.e., having the role of) the adverb in the initial triple is really an adverb (i.e., is mapped to an adverb in the WordNet® lexical database)

"unknown" if the term representing (i.e., having the role of) the adverb in the initial triple is a noun (i.e., is mapped to a noun and not an adverb in the WordNet® lexical database)

The example presented below illustrates a case in which the adverb is not linked to an adjective that has an attribute:
(fish, swim efficiently, water)
  becomes
(fish, swim, fish+water-swimming),
(fish+water-swimming, is_a, swimming),
(fish+water-swimming, has_property, water),
(fish+water-swimming, has_attribute, fish+water-swimming-efficiency),
fish+water-swimming-efficiency.has_value='yes'

The example presented below illustrates a case in which the adverb is linked to an adjective that has an attribute:
(fish, swim heavily, mud)
  becomes
(fish, swim, fish+swim+mud),
(fish+swim+mud, is_a, swim),
(fish+swim+mud, has_attribute, mud),
(fish+swim+mud, has_attribute, weight),
fish+swim+mud.weight.has_value='heavy'

The core terms of adjectives are transformed according to the following pattern:
<adjective_term subject_term, predicate_term, object_term>
becomes the following set:
<adjective_term+subject_term, predicate_term, object_term>
<adjective_term+subject_term, is_a, subject_term>

If the adjective has an attribute, the nounified adjective is the attribute, and the transformation of the adjective follows the pattern presented below:
<adjective_term+subject_term, has_attribute, adjective_term+subject_term-nounified_adjective>
<adjective_term+subject_term-nounified_adjective, is_a, nounified_adjective>adjective_term+subject_term-nounified_adjective. has_value=adjective If the adjective is actually a noun, then the concept represented by the noun must be represented, and the assignment in the pattern presented above for an adjective that has an attribute must become a triple in the transformation of the adjective, as shown by the following pattern:
<adjective_term+subject_term-nounified_adjective, has_value, adjective>

If the adjective has no attribute, then the transformation follows the pattern presented below:
<adjective_term+subject_term, has_property, adjective_term+subject_term-nounified_adjective>
<adjective_term+subject_term-nounified_adjective, is_a, nounified_adjective>
adjective_term+subject_term-nounified_adjective. has_value=default value or value provided by the end-user The default value assigned to a "nounified_adjective" by the ontology builder 106 (see FIG. 1) is:

"yes" if the term representing (i.e., having the role of) the adjective in the initial triple is really an adjective (i.e., is mapped to an adjective in the WordNet® lexical database)

"unknown" if the term representing (i.e., having the role of) the adjective in the initial triple is a noun (i.e., is mapped to a noun and not an adjective in the WordNet® lexical database)

The example presented below illustrates a case in which the adjective has an attribute:
<red car, has, high performance>
  becomes:
<red+car, is_a, car>
<red+car, has_attribute, red+car-hue>
red+car-hue.has_value=red
<red+car-hue, is_a, hue>
<red+car, has, high performance>
and the last triple becomes:
<red+car, has, high+performance>
<high+performance, is_a, performance>
<high+performance, has_attribute, high+performance-degree>
high+performance-degree.value=high
<high+performance-degree, is_a, degree>

In one embodiment, the non-core terms are annotated as "characteristics" of the core term to which they are related. Three transformation patterns of non-core terms are presented below:

1. <subject_term, predicate_term, object_term non_core_terms>
  becomes the following set:
  <subject_term, predicate_term, subject_term-object_term>
  <subject_term-object_term, is_a, object_term>
  subject_term-object_term.characteristic=non_core_terms 2. <subject_term non_core_terms, predicate_term, object_term>
  becomes the following set:
  <object_term-subject_term, predicate_term, object_term>
  <object_term-subject_term, is_a, subject_term>
  object_term-subject_term.characteristic=non_core_terms 3. <subject_term, predicate_term non_core_terms, object_term>
  becomes the following set:
  <subject_term, predicate_term, subject_term+object_term-nounified_predicate>
  <subject_term+object_term-nounified_predicate, is_a, nounified_predicate>
  <subject_term+object_term-nounified_predicate, has_attribute, object_term>
  subject_term+object_term-nounified_predicate.characteristic=non_core_terms The three examples presented below illustrate transformations of non-core terms according to the transformation patterns presented above:

1. <car, run, road with asphalt>
  is transformed into:
  <car, run, car-road>
  <car-road, is_a, road>
  car-road.has_characteristic='with asphalt'

2. <car with 4 wheels, run, road>
  is transformed into:
  <road-car, run, road>
  <road-car, is_a, car> road-car.has_characteristic='with 4 wheels'
3. <car, run every week-end, road>
   is transformed into:
<car, run, car+road-running>
<car+road-running, is_a, running>
<car+road-running, has_attribute, road>
car+road-running.has_characteristic='every week-end'

In one embodiment, the ontology builder 106 (see FIG. 1) performs the following steps to nounify (i.e., conceptualize) a predicate:

1. The ontology builder 106 (see FIG. 1) provides to an end user a list of verbs in the WordNet® lexical database that lexically match the "predicate_term", and prompts the end user to select from the WordNet® lexical database a definition of one of the verbs on the list provided to the end user.

2. The ontology builder 106 (see FIG. 1) provides the end user the list of nouns in the WordNet® lexical database that are in the "derivationally related forms" set that is associated with the verb whose definition was selected in Step 1, and prompts the end user to select one of the nouns in the list of nouns provided to the end user.

3. The ontology builder 106 (see FIG. 1) uses the selected noun as the nounified_predicate.

4. If the end user does not find any noun in the list of nouns to match the meaning desired by the end user, the ontology builder 106 (see FIG. 1) determines hypernyms and hyponyms that are included in the WordNet® lexical database and that are associated with the nouns provided in Step 2. The ontology builder 106 (see FIG. 1) then presents lists of the hypernyms and hyponyms to the end user.

5. If the end user can still not select a noun based on the lists of hypernyms and hyponyms presented in Step 4, the ontology builder 106 (see FIG. 1) invents a noun to represent the nounified_predicate, and stores the invented noun in the ontology meta-schema 116 (see FIG. 1) along with the triples the invented noun is involved in, for future references when building other ontology schemas.

6. If a nounified_predicate is invented in Step 5, it is created from the predicate and the suffix "_ness".

In one embodiment, the ontology builder 106 (see FIG. 1) performs the following steps to nounify an adverb:

1. The ontology builder 106 (see FIG. 1) provides an end user a list of adverbs in the WordNet® lexical database that lexically match the "adverb_term", and prompts the end user to select from the WordNet® lexical database a definition of one of the adverbs in the list of adverbs provided to the end user.

If the ontology builder 106 (see FIG. 1) does not find any matching adverb in the WordNet® lexical database, then the ontology builder searches for and finds a set of nouns lexically matching the "adverb_term", and prompts the end user to select one noun from the set of found nouns. The situation of not finding a matching adverb may arise, for example, if the end-user has decided that "with efficiency" represents an adverb in the triple <fish, swim with efficiency, water>.

If the end user selects a noun in the set of nouns found by the ontology builder 106 (see FIG. 1), selected noun is checked in the Suggested Upper Merged Ontology (SUMO) to see if the selected noun relates to a SUMO attribute. SUMO is an upper ontology maintained by Articulate Software® located in San Francisco, Calif. If the selected noun does not relate to a SUMO attribute, the noun is considered as the nounified adverb. If the selected noun relates to a SUMO attribute and if the attribute is accepted by the end user, then the SUMO attribute is considered as the nounified adverb, and the SUMO attribute must be aligned to an identification key associated with a WordNet® lexical database definition.

If the adverb cannot be nounified in Step 1 of the steps to nounify an adverb, the subsequent steps (i.e., Steps 2 to 10 presented below) must be applied.

2. The ontology builder 106 (see FIG. 1) provides the end user with a list of adjectives in the WordNet® lexical database that are in the "pertainym" set associated with the selected adverb, and prompts the end user to select one adjective from the list of adjectives provided to the end user.

3. The ontology builder 106 (see FIG. 1) provides the end user with a list of attributes from the WordNet® lexical database that are related to the selected adjective, or that are related to every adjective in the set of terms that are in the "similar to" relationship with the selected adjective. Ontology builder 106 (see FIG. 1) also prompts the end user to select an attribute from the list of attributes provided to the end user.

4. If there is no attribute found in the WordNet® lexical database, the ontology builder 106 (see FIG. 1) searches the WordNet® lexical database to determine whether the selected adjective or the "similar to" adjectives (i.e., the adjectives related to the selected adjective by the "similar to" relationship) are related to a SUMO attribute type. Ontology builder 106 (see FIG. 1) presents to the end user the possible SUMO attributes and prompts the end user to select one of the presented SUMO attributes. If a SUMO attribute is selected by the end user, it must be aligned to an identification key of a definition in the WordNet® lexical database.

5. If an attribute is selected by the end user, ontology builder 106 (see FIG. 1) designates the selected attribute as the nounified_adverb.

6. If there is no attribute selected by the end user, ontology builder 106 (see FIG. 1) presents the end user with a list of nouns in the WordNet® lexical database that the ontology builder finds in the "derivationally related forms" set of the WordNet® lexical database, where the "derivationally related forms" set is associated with the selected adjective or associated with the selected adjective's "similar to" adjectives. Ontology builder 106 (see FIG. 1) subsequently prompts the end user to select one of the nouns in the list presented to the end user.

7. If the end user does not find any noun that matches the meaning desired by the end user, the ontology builder 106 (see FIG. 1) presents to the end user a list of hypernyms and hyponyms that the ontology builder finds in the WordNet® lexical database, where the hypernyms and hyponyms are associated with every noun found in Step 6.

8. If the end user has selected a noun, the ontology builder 106 (see FIG. 1) designates that the selected noun represents the nounified_adverb.

9. If the end user could not select a noun, the ontology builder 106 (see FIG. 1) invents a noun to represent the nounified_adverb, and stores the invented noun in the ontology meta-schema 116 (see FIG. 1), along with the triples the invented noun is involved in, for future references when building other ontology schemas.

10. If the ontology builder 106 (see FIG. 1) invents a nounified_adverb, then the ontology builder creates the nounified_adverb from the adverb and the suffix "_ness".

In one embodiment, the ontology builder 106 (see FIG. 1) performs the following steps to nounify an adjective:

1. The ontology builder 106 (see FIG. 1) provides the end user with a list of adjectives in the WordNet® lexical database that lexically match to the "adjective_term" (i.e., the adjective being nounified), and prompts the end user to select a definition of one of the adjectives in the list provided to the end user.

In case the ontology builder 106 (see FIG. 1) does not find a adjective in the WordNet® lexical database that matches the "adjective_term," the ontology builder 106 (see FIG. 1) searches for and finds a set of nouns in the WordNet® lexical database that lexically match the "adjective_term" and prompts the end user to select one noun from the nouns found to be matching the "adjective_term." If the end user selects a noun in the set of nouns found by the ontology builder 106 (see FIG. 1), the ontology builder 106 (see FIG. 1) checks the selected noun in SUMO to determine if the selected noun is related to a SUMO attribute. If the selected noun is not related to a SUMO attribute, the ontology builder 106 (see FIG. 1) designates the selected noun as the nounified adjective. If the selected noun is related to a SUMO attribute, and if the attribute is accepted by the end user, the ontology builder 106 (see FIG. 1) designates the SUMO attribute as the nounified adjective, and the SUMO attribute must be aligned to an identification key of a definition in the WordNet® lexical database.

If the adjective is not nounified in Step 1 of the set of steps for nounifying an adjective, then the ontology builder 106 (see FIG. 1) must perform the subsequent steps (i.e., Steps 2 to 8 presented below).

2. The ontology builder 106 (see FIG. 1) provides the end-user with a list of attributes from the WordNet® lexical database that are related to the selected adjective, or that are related to an adjective that are the "similar to" relationship with the selected adjective. Ontology builder 106 (see FIG. 1) also prompts the end user to select an attribute from the list of attributes provided to the end user.

3. If the end-user has selected an attribute, the ontology builder 106 (see FIG. 1) designates the selected attribute as the nounified_adjective.

4. If the end-user does not select an attribute, ontology builder 106 (see FIG. 1) presents to the end user a list nouns in the WordNet® lexical database that the ontology builder finds in the "derivationally related forms" set of the WordNet® lexical database, where the "derivationally related forms" set is associated with the selected adjective or associated with the selected adjective's "similar to" adjectives. Ontology builder 106 (see FIG. 1) subsequently prompts the end user to select one of the, and is asked to select one noun from the list of nouns presented to the end user.

5. If the end user has selected a noun, the ontology builder 106 (see FIG. 1) designates that the selected noun is the nounified_adjective.

6. If the end user does not find any noun that matches the meaning desired by the end user, the ontology builder 106 (see FIG. 1) presents to the end user a list of hypernyms and hyponyms that the ontology builder finds in the WordNet® lexical database, where the hypernyms and hyponyms are associated with every noun found in Step 4.

7. If the end user can still not select a noun, ontology builder 106 (see FIG. 1) invents a noun to represent the nounified_adjective, and stores the invented noun in the ontology meta-schema 116 (see FIG. 1) along with the triples the invented noun is involved in, for future references when building other ontology schemas.

8. If the ontology builder 106 (see FIG. 1) invents the nounified_adjective, then the ontology builder creates the nounified_adjective from the adjective and the suffix "_ness".

If the grammar 112 (see FIG. 1) is such that it discriminates prepositions to be processed, these prepositions cannot be aligned in the WordNet® lexical database because the WordNet® lexical database has no definitions for prepositions. Therefore, ontology builder 106 (see FIG. 1) considers a preposition as an adjective when the preposition is associated with a subject or an object, and as an adverb when the preposition is associated with a predicate.

The aforementioned adverbs and adjectives (i.e., small adverbs and small adjectives) that are lexically equivalent to a prepositions usually do not link to other terms in the WordNet® lexical database. On the other hand, the definitions in the WordNet® lexical database of these small adverbs and adjectives are very short. In the case of a small adverb or small adjective, the ontology builder 106 (see FIG. 1) extracts and selects the main noun from the definition in the WordNet® lexical database to represent the small adverb or small adjective. The selection of the main noun to represent the small adverb or small adjective may utilize interaction with the end user.

For example, consider the preposition "through,", where "through" is considered as an adverb in the triple <fish, swim_through, water> and is considered as an adjective in the triple <fish, swim, through water>.

When "through" is considered as an adverb, the following definition applies:
   (adv) through (over the whole distance) "this bus goes through to NewYork"

The above-mentioned definition of "through" as an adverb is not related to any other terms WordNet® lexical database. The ontology builder 106 (see FIG. 1) extracts the term "distance" to represent the nounified adverb:
   <fish, move_through, water>
      is transformed into:
   <fish, move, fish+water-motion>
   <fish+water-motion, is_a, motion>
   <fish+water-motion, has_property, water>
   <fish+water-motion, has_property, fish+water-motion-distance>
   fish+water-motion-distance.value=unknown
   <fish+water-motion-distance, is_a, distance>

It should be noted that in the above explanations, for clarity and performance reasons, the ontology builder 106 (see FIG. 1) nounifies and transforms all adjectives before nounifying and transforming the adverb.

During the nounification of the adverbs, the ontology builder 106 (see FIG. 1) nounifies the verbs associated with the adverbs. After the required nounification of all verbs is done, it is necessary for the ontology builder 106 (see FIG. 1) to check whether (1) a predicate (i.e., "predicate1") identical to a nounified verb and (2) a subject (i.e., "subject1") identical to the subject of the nounified verb are used in one or more other triples. If the check determines the use of predicate1 and subject1 in one or more other triples, then the ontology builder 106 (see FIG. 1) removes the relationship that predicate1 represents between its subject and object and replaces the removed relationship by a "has_property" relationship between the nounified verb and the object of predicate1. For example, consider the triple (fish, swims, swimming), where "swimming" is a nounified verb and further consider the triple (fish, swims, length), which is another triple that involves the predicate "swim" and the subject "fish". The latter triple must be removed and transformed into: (swimming, has_property, length).

Note that the example provided below introduce terms that are needed to represent the semantic constraints.

For example, consider the following triples:
<car, move, car-movement>
<car-movement, is_a, movement>
<car-movement, has_property, road>

The triples in the example presented above illustrate that "road" is a property of movement only when it is a movement of a car. These relationships can be simplified for presentation and handling by the end user. The above-mentioned triples may be simplified into:
<car, move, movement>
<-movement, has_property, road>

Enrichment Transformation

FIG. 6 is a flowchart of a process of enrichment transformation of simplified triples included in the process of FIG. 3, in accordance with embodiments of the present invention. In one embodiment, the process of FIG. 6 is included in step 308 (see FIG. 3). The process of FIG. 6 starts at step 600. In step 602, complex triples transformation tool 110 (see FIG. 1) enriches each core term in the simplified triples resulting from the semantic transformation in the process of FIG. 5 or in step 306 (see FIG. 3) (hereinafter, referred to simply as "the simplified triples"). The enrichment performed by complex triples transformation tool 110 (see FIG. 1) in step 602 includes adding simple triples that describe taxonomic relationship(s) of the core term to new concept(s) found in reference ontology 114 (see FIG. 1), thereby specifying the relationship(s) between the core term and all of the core term's semantic correspondences in the reference ontology 114 (see FIG. 1). The simple triples describing the aforementioned taxonomic relationship(s) are added only if the relationships are not yet represented in the ontology being built by the process of FIG. 2. Because the enrichment transformation is part of an iterative process (see the loop in FIG. 3), one or more relationships may already be present in the ontology being built, and therefore do not need to be described by simplified triples being added in the current performance of step 602.

Step 602 requires that complex triples transformation tool 110 (see FIG. 1) access ontology meta-schema 116 to determine what relationships are possible for the core terms, but does not require end user interactions.

In step 604, complex triples transformation tool 110 (see FIG. 1) enriches each core term in the simplified triples by obtaining the definition of the core term from reference ontology 114 (see FIG. 1), analyzing the obtained definition and creating a new set of complex triples based on the obtained definition. The aforementioned step of analyzing the obtained definition may be performed by a Text Analyzer external to or built into the ontology builder 106 (see FIG. 1).

In step 606, complex triples transformation tool 110 (see FIG. 1) stores the new simplified triples and the new set of complex triples created in step 604 in the ontology meta-schema 116. By storing the new simplified triples, the semantic schemas representing the obtained definitions are stored so that one or more of the semantic schemas may be re-used in future performances of the ontology building process of FIG. 2.

In step 608, complex triples transformation tool 110 (see FIG. 1) updates the analysis depth parameter (e.g., decrements the analysis depth parameter by one).

The process of FIG. 6 ends at step 610.

Merging Ontologies

Figure 7:
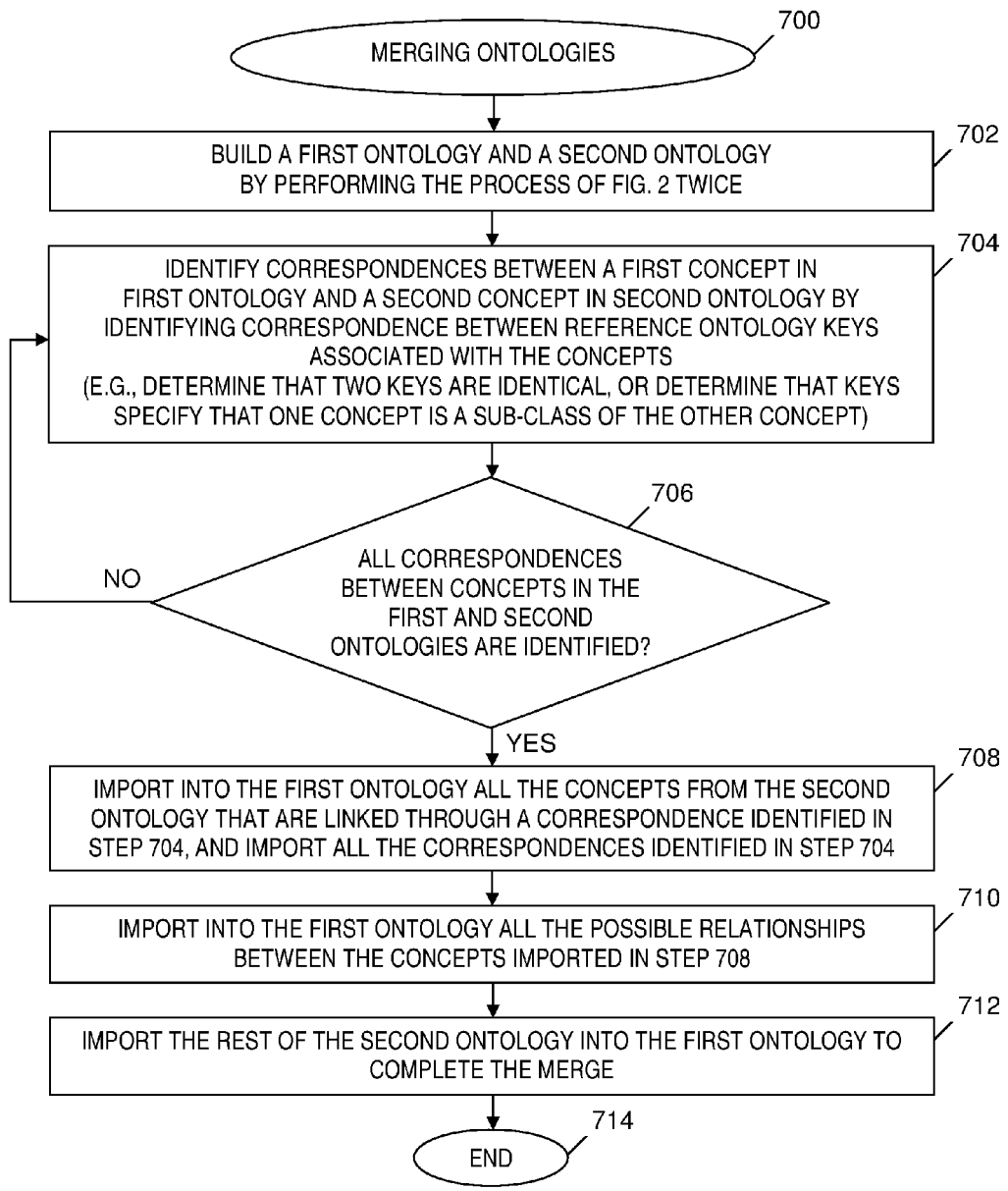
FIG. 7 is a flowchart of a process of merging ontologies built by the process of FIG. 2, in accordance with embodiments of the present invention.

FIG. 7 is a flowchart of a process of merging ontologies built by the process of FIG. 2, in accordance with embodiments of the present invention. The process of FIG. 7 starts at step 700. In step 702, ontology builder 106 (see FIG. 1) running in a first computer system builds a first ontology by a first performance of the process of FIG. 2. Ontology builder 106 (see FIG. 1) running in a second computer system builds a second ontology by a second performance of the process of FIG. 2. In one embodiment, the first and second computer systems are different (e.g., computer system 102-1 and 102-N in FIG. 1) and collaborate via network 103 (see FIG. 1). In another embodiment, the first and second computer systems are the same computer system (e.g., computer system 102-1 in FIG. 1).

In step 704, ontology builder 106 (see FIG. 1) running in the first computer system identifies correspondences between a first concept in the first ontology and a second concept in the second ontology by identifying correspondence between identification keys in reference ontology 114 (see FIG. 1), where the identification keys are associated with the first and second concepts. For example, ontology builder 106 (see FIG. 1) determines that the two identification keys (1) are identical, (2) specify that the first concept is a sub-class of the second concept, or (3) specify that the second concept is a sub-class of the first concept.

In step 706, if ontology builder 106 (see FIG. 1) determines that all correspondences between concepts in the first and second ontologies are identified, then the Yes branch of step 706 is taken and step 708 is performed. If ontology builder 106 (see FIG. 1) determines in step 706 that not all correspondences between concepts in the first and second ontologies are identified, then the No branch of step 706 is taken and the process loops back to step 704, in which an updated first and/or second concept is processed.

In step 708, ontology builder 106 (see FIG. 1) imports into the first ontology stored in ontology data repository 108-1 (see FIG. 1) all the concepts from the second ontology that are linked through a correspondence identified in step 704.

In step 710, ontology builder 106 (see FIG. 1) imports into the first ontology stored in ontology data repository 108-1 (see FIG. 1) all the possible relationships between the concepts imported in step 708.

In step 712, ontology builder 106 (see FIG. 1) imports the rest of the second ontology into the first ontology stored in ontology data repository 108-1 (see FIG. 1), which completes the merge of the first and second ontologies built in step 702.

The process of FIG. 7 ends at step 714.

Adaptability

Embodiments of the present invention provide an ontology building system that is adaptable by becoming more efficient over time as the system is used repeatedly. As discussed above relative to FIG. 6, the system may be automatically enriched by the semantic schema of definitions coming from the reference ontology 114 (see FIG. 1), and by the semantic schema of new concepts not available in the reference ontology 114 (see FIG. 1) and represented by invented terms. The aforementioned semantic schema become available for re-use during a subsequent building of an ontology with the process of FIG. 2.

The ontology building system may evolve over time, through adaptation by a human knowledge engineer. The system allows a knowledge engineer to analyze the lists of invented terms and the way the standard relationships are used, in order to improve the ontology meta-schema 116 (see FIG. 1), the transformation rules, and the grammar 112 (see FIG. 1), thereby allowing analysis of a more complex structure.

The characteristics and the attributes described by ontology meta-schema 116 (see FIG. 1) may be analyzed by a knowledge engineer to make the grammar 112 (see FIG. 1)

and ontology meta-schema 116 (see FIG. 1) more complete, thereby making the system more effective over time.

Typically, the analysis of characteristics leads to the identification of a new standard underlying structure that can be incorporated into a new version of the grammar 112 (see FIG. 1), together with new transformation rules for conceptualization.

Typically, the analysis of attributes leads to the identification of possible new standard relationships. For instance, the analysis of the attributes in the following triples: (swim, has_attribute, water), (fly, has_attribute, air) . . . may lead to the creation of a new standard relationship "has_element", and to the transformation rules required to use the new standard relationship.

The invented terms appearing as the object in a "has_attribute" relationship may be analyzed to discover new attribute types such as "color", "size", "quality", "location", "shape", etc.

The new standard relationship, as well as the new attributes with the list of the new attributes' possible values, may be stored in the ontology meta-schema 116 (see FIG. 1). The possible attribute values may evolve over time, with the analysis done by the knowledge engineer.

In one embodiment, the ontology building system requires that each semantic schema built by the process of FIG. 2 must refer to the version of the ontology meta-schema used when the semantic schema was built, thereby allowing versioning management. Based on the aforementioned mandated referencing to the version of the meta-schema, an embodiment of the present invention may automatically upgrade existing ontologies to make the existing ontologies compatible with new meta-schema versions. Because of the versioning management, the adaptations of the ontology meta-schema 116 (see FIG. 1) are improvements that do not invalidate the ontologies built with previous versions of the meta-schema.

Computer System

Figure 8:
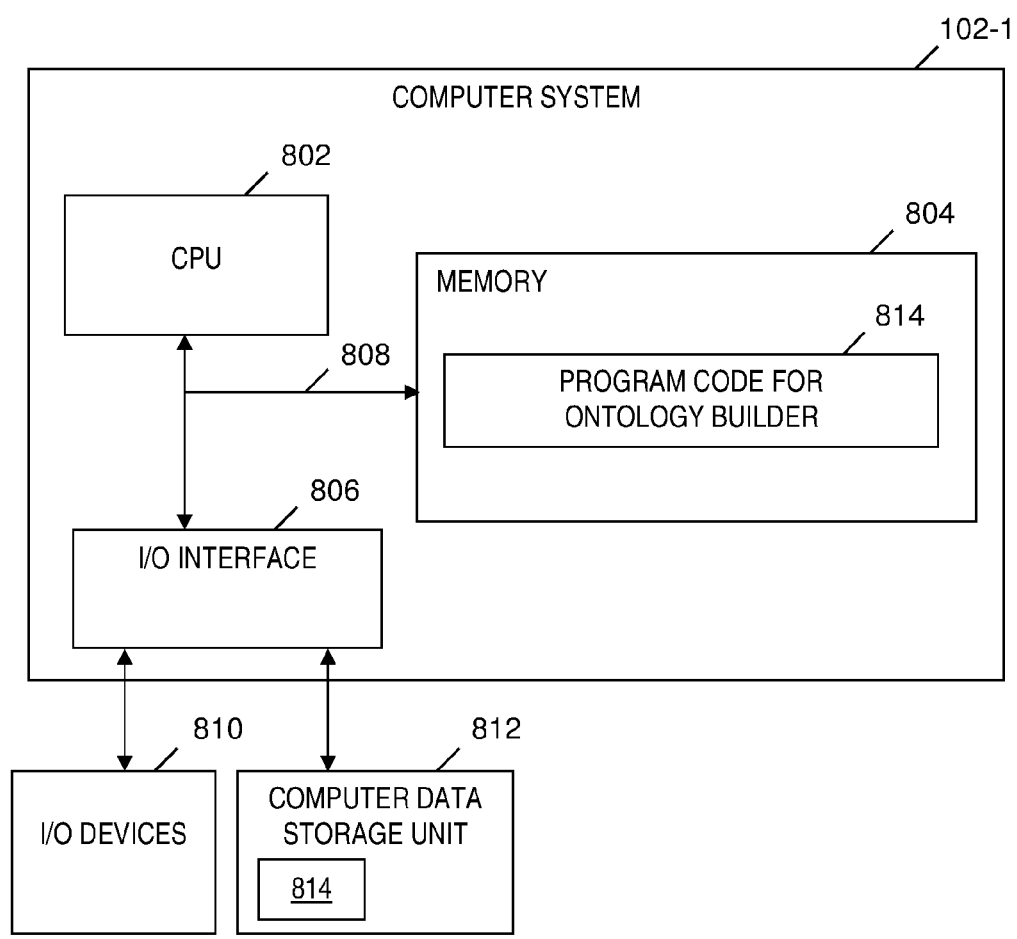
FIG. 8 is a block diagram of a computer system that is included in the system of FIG. 1 and that implements the process of FIG. 2, in accordance with embodiments of the present invention.

FIG. 8 is a block diagram of a computer system that is included in the system of FIG. 1 and that implements the process of FIG. 2, in accordance with embodiments of the present invention. Computer system 102-1 generally comprises a central processing unit (CPU) 802, a memory 804, an input/output (I/O) interface 806, and a bus 808. Further, computer system 102-1 is coupled to I/O devices 810 and a computer data storage unit 812. CPU 802 performs computation and control functions of computer system 102-1, including carrying out instructions included in program code 814 to perform a method of building an ontology by transforming complex triples, where the instructions are carried out by CPU 802 via memory 804. CPU 802 may comprise a single processing unit, or be distributed across one or more processing units in one or more locations (e.g., on a client and server). In one embodiment, program code 814 includes program code included in ontology builder 106 (see FIG. 1) and complex triples transformation tool 110 (see FIG. 1).

Memory 804 may comprise any known computer-readable storage medium, which is described below. In one embodiment, cache memory elements of memory 804 provide temporary storage of at least some program code (e.g., program code 814) in order to reduce the number of times code must be retrieved from bulk storage while instructions of the program code are carried out. Moreover, similar to CPU 802, memory 804 may reside at a single physical location, comprising one or more types of data storage, or be distributed across a plurality of physical systems in various forms. Further, memory 804 can include data distributed across, for example, a local area network (LAN) or a wide area network (WAN).

I/O interface 806 comprises any system for exchanging information to or from an external source. I/O devices 810 comprise any known type of external device, including a display device (e.g., monitor), keyboard, mouse, printer, speakers, handheld device, facsimile, etc. Bus 808 provides a communication link between each of the components in computer system 102-1, and may comprise any type of transmission link, including electrical, optical, wireless, etc.

I/O interface 806 also allows computer system 102-1 to store information (e.g., data or program instructions such as program code 814) on and retrieve the information from computer data storage unit 812 or another computer data storage unit (not shown). Computer data storage unit 812 may comprise any known computer-readable storage medium, which is described below. For example, computer data storage unit 812 may be a non-volatile data storage device, such as a magnetic disk drive (i.e., hard disk drive) or an optical disc drive (e.g., a CD-ROM drive which receives a CD-ROM disk).

Memory 804 and/or storage unit 812 may store computer program code 814 that includes instructions that are carried out by CPU 802 via memory 804 to build an ontology by transforming complex triples. Although FIG. 8 depicts memory 804 as including program code 814, the present invention contemplates embodiments in which memory 804 does not include all of code 814 simultaneously, but instead at one time includes only a portion of code 814.

Further, memory 804 may include other systems not shown in FIG. 8, such as an operating system (e.g., Linux) that runs on CPU 802 and provides control of various components within and/or connected to computer system 102-1.

Storage unit 812 and/or one or more other computer data storage units (not shown) that are coupled to computer system 102-1 may store grammar 112 (see FIG. 1), reference ontology 114 (see FIG. 1), ontology meta-schema 116 (see FIG. 1) and ontologies 108-1 . . . 108-N (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 804 and/or computer data storage unit 812) having computer-readable program code (e.g., program code 814) embodied or stored thereon.

Any combination of one or more computer-readable mediums (e.g., memory 804 and computer data storage unit 812) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 814) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 814) embodied on a computer-readable medium may be transmitted using any appropriate medium, including but not limited to wireless, wireline, optical fiber cable, RF, etc., or any suitable combination of the foregoing.

Computer program code (e.g., program code 814) for carrying out operations for aspects of the present invention may be written in any combination of one or more programming languages, including an object oriented programming language such as Java °, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102-1 or another computer system (not shown) having components analogous to the components of computer system 102-1 included in FIG. 8. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3, FIGS. 4A-4F, FIG. 5, FIG. 6 and FIG. 7) and/or block diagrams of methods, apparatus (systems) (e.g., FIG. 1 and FIG. 8), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 814). These computer program instructions may be provided to one or more hardware processors (e.g., CPU 802) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 804 or computer data storage unit 812) that can direct a computer (e.g., computer system 102-1), other programmable data processing apparatus, or other devices to function in a particular manner, such that the instructions (e.g., program 814) stored in the computer-readable medium produce an article of manufacture including instructions which implement the function/act specified in the flowchart and/or block diagram block or blocks.

The computer program instructions may also be loaded onto a computer (e.g., computer system 102-1), other programmable data processing apparatus, or other devices to cause a series of operational steps to be performed on the computer, other programmable apparatus, or other devices to produce a computer implemented process such that the instructions (e.g., program 814) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to building an ontology by transforming complex triples. Thus, an embodiment of the present invention discloses a process for supporting computer infrastructure, wherein the process comprises a first computer system providing at least one support service for at least one of integrating, hosting, maintaining and deploying computer-readable code (e.g., program code 814) in a second computer system (e.g., computer system 102-1) comprising one or more processors (e.g., CPU 802), wherein the processor(s) carry out instructions contained in the code causing the second computer system to build an ontology by transforming complex triples.

In another embodiment, the invention provides a method that performs the process steps of the invention on a subscription, advertising and/or fee basis. That is, a service provider, such as a Solution Integrator, can offer to create, maintain, support, etc. a process of building an ontology by transforming complex triples. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2, FIG. 3, FIGS. 4A-4F, FIG. 5, FIG. 6 and FIG. 7 and the block diagrams in FIG. 1 and FIG. 8 illustrate the architecture, functionality, and operation of possible implementations of systems, methods, and computer program products according to various embodiments of the present invention. In this regard, each block in the flowchart or block diagrams may represent a module, segment, or portion of code (e.g., program code 814), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising:
a central processing unit (CPU);
a memory coupled to the CPU; and
a computer readable storage device coupled to the CPU, the storage device containing instructions that are executed by the CPU via the memory to implement a method of building an ontology, the method comprising the steps of:
the computer system extracting a plurality of complex triples from free-form text provided by a software application, each complex triple including a compound subject, a compound predicate and a compound object;
the computer system performing a syntactic transformation of the plurality of complex triples by, based on a grammar, identifying core terms and non-core terms in the plurality of complex triples, identifying syntactic elements in the plurality of complex triples including nouns, verbs, adjectives and adverbs, and standardizing the plurality of complex triples, wherein a result of the step of performing the syntactic transformation is a plurality of syntactically transformed complex triples whose terms are aligned to the grammar;
the computer system performing a semantic transformation of the plurality of syntactically transformed complex triples into respective one or more simplified triples included in a plurality of simplified triples by assigning each core term included in the plurality of simplified triples to exactly one term definition and to exactly one identification key of a reference ontology, wherein each simplified triple includes a subject term, a predicate term and an object term, and wherein each of the one or more simplified triples retains the semantics of the respective syntactically transformed complex triple;
based in part on a meta-schema of the reference ontology, the computer system performing an enrichment transformation of the plurality of simplified triples into a plurality of simplified and enriched triples by adding relations derived from a correspondence each term in the plurality of simplified triples has with the reference ontology and by adding representations of semantics of definitions of terms in the plurality of simplified triples, wherein the definitions are included in the reference ontology;
based on the plurality of simplified and enriched triples, the computer system generating a new ontology that is aligned with the reference ontology and that represents knowledge included within the software application that provides the free-form text, the new ontology addressing a first domain of expertise;
the computer system aligning another ontology with the reference ontology, the other ontology addressing a second domain of expertise that is different from the first domain of expertise; and based on the new ontology and the other ontology being aligned with the reference ontology, the computer system merging the new ontology and the other ontology even though the first and second domains of expertise are different,
wherein the step of performing the syntactic transformation of the plurality of complex triples includes:
determining a term of a complex triple included in the plurality of complex triples is a core term and is an adjective; and
determining the adjective is linked to a core noun included in the complex triple,
wherein the step of performing the semantic transformation of the plurality of syntactically transformed complex triples into the respective one or more simplified triples included in the plurality of simplified triples is based in part on the adjective linked to the core noun included in the complex triple and includes generating a conceptualized adjective from the adjective, wherein the step of generating the conceptualized adjective includes:
sending to a user a list of attributes included in a lexical database that are related to the adjective and determining whether the user selects one of the attributes in the list of attributes;
if the user selects one of the attributes, designating the selected attribute as the conceptualized adjective;
if the user does not select one of the attributes, sending to the user a list of nouns in the lexical database that are derivationally related forms of the adjective and determining whether the user selects one of the nouns in the list of nouns;
if the user selects one of the nouns, designating the selected noun as the conceptualized adjective;
if the user does not select one of the nouns, sending to the user a list of hypernyms and hyponyms that the lexical database associates with the nouns in the list of nouns, and determining whether the user selects one of the hypernyms or one of the hyponyms;
if the user selects one of the hypernyms or one of the hyponyms, designating the selected hypernym or hyponym as the conceptualized adjective; and
if the user does not select one of the hypernyms or hyponyms, creating the conceptualized adjective by adding a suffix _ness to an end of the adjective,
wherein the step of performing the enrichment transformation of the plurality of simplified triples is based in part on the conceptualized adjective and includes the step of generating a new set of complex triples that represents the semantics of the definitions of core terms in the plurality of simplified triples, and wherein the method further comprises the steps of:
the computer system receiving a desired analysis depth and initializing an analysis depth parameter;
based on the grammar, the computer system syntactically transforming the new set of complex triples into a new syntactically transformed set of complex triples;
the computer system semantically transforming the new syntactically transformed set of complex triples into a new set of simplified triples;
the computer system updating the analysis depth parameter subsequent to the steps of syntactically transforming and semantically transforming; and while the updated analysis depth parameter does not indicate the desired analysis depth, the computer system:
  performing an enrichment transformation on the new set of simplified triples to generate another new set of complex triples; and
  repeating, for the other new set of simplified triples, the steps of syntactically transforming, semantically transforming, and updating the analysis depth parameter.

2. The computer system of claim 1, wherein the method further comprises:
  the computer system receiving a second plurality of complex triples extracted from other free-form text provided by another software application;
  the computer system performing a syntactic transformation of the second plurality of complex triples, wherein a result of the step of performing the syntactic transformation is a second plurality of syntactically transformed complex triples whose terms are aligned to the grammar;
  the computer system performing a semantic transformation of the second plurality of syntactically transformed complex triples into respective one or more simplified triples included in a second plurality of simplified triples;
  based in part on the meta-schema of the reference ontology, the computer system performing an enrichment transformation of the second plurality of simplified triples into a second plurality of simplified and enriched triples by adding second relations derived from a correspondence each term in the second plurality of simplified triples has with the reference ontology and by adding second representations of semantics of definitions of terms in the second plurality of simplified triples, wherein the definitions of terms in the second plurality of simplified triples are included in the reference ontology;
  the computer system storing the second plurality of simplified and enriched triples as a second new ontology that represents knowledge included within the second software application that provides the other free-form text;
  the computer system syntactically and semantically transforming the plurality of simplified and enriched triples into a first new set of simple triples;
  the computer system syntactically and semantically transforming the second plurality of simplified and enriched triples into a second new set of simple triples; and
  the computer system determining a cross-ontology correspondence between the new ontology and the second new ontology by the computer system determining a semantic correspondence between the first new set of triples and the second new set of triples.

3. The computer system of claim 1, wherein the step of the computer system performing the semantic transformation of the plurality of syntactically transformed complex triples into the respective one or more simplified triples included in the plurality of simplified triples includes:
  determining a noun is needed in a simplified triple of the respective one or more simplified triples;
  determining the reference ontology and meta-schema of the reference ontology do not include a definition of the noun needed in the simplified triple;
  generating the noun that is determined to be needed in the simplified triple;
  generating a definition of the noun as relationships between the noun and terms in the new ontology being built;
  storing the noun and the definition of the noun in the meta-schema of the reference ontology; and
  based in part on the stored noun and the stored definition of the noun, building a second new ontology.

4. A computer program product, comprising:
  a computer-readable, storage device; and
  a computer-readable program code stored in the computer-readable, storage device, the computer-readable program code containing instructions that are executed by a central processing unit (CPU) of a computer system to implement a method of building an ontology, the method comprising the steps of:
    the computer system extracting a plurality of complex triples from free-form text provided by a software application, each complex triple including a compound subject, a compound predicate and a compound object;
    the computer system performing a syntactic transformation of the plurality of complex triples by, based on a grammar, identifying core terms and non-core terms in the plurality of complex triples, identifying syntactic elements in the plurality of complex triples including nouns, verbs, adjectives and adverbs, and standardizing the plurality of complex triples, wherein a result of the step of performing the syntactic transformation is a plurality of syntactically transformed complex triples whose terms are aligned to the grammar;
    the computer system performing a semantic transformation of the plurality of syntactically transformed complex triples into respective one or more simplified triples included in a plurality of simplified triples by assigning each core term included in the plurality of simplified triples to exactly one term definition and to exactly one identification key of a reference ontology, wherein each simplified triple includes a subject term, a predicate term and an object term, and wherein each of the one or more simplified triples retains the semantics of the respective syntactically transformed complex triple;
    based in part on a meta-schema of the reference ontology, the computer system performing an enrichment transformation of the plurality of simplified triples into a plurality of simplified and enriched triples by adding relations derived from a correspondence each term in the plurality of simplified triples has with the reference ontology and by adding representations of semantics of definitions of terms in the plurality of simplified triples, wherein the definitions are included in the reference ontology;
    based on the plurality of simplified and enriched triples, the computer system generating a new ontology that is aligned with the reference ontology and that represents knowledge included within the software application that provides the free-form text, the new ontology addressing a first domain of expertise;
    the computer system aligning another ontology with the reference ontology, the other ontology addressing a second domain of expertise that is different from the first domain of expertise; and
    based on the new ontology and the other ontology being aligned with the reference ontology, the computer system merging the new ontology and the other ontology even though the first and second domains of expertise are different, wherein the step of performing the syntactic transformation of the plurality of complex triples includes:
  determining a first term of a complex triple included in the plurality of complex triples is a core term and is a verb; and
  determining a second term of the complex triple is an object, wherein the step of performing the semantic transformation of the plurality of syntactically transformed complex triples into the respective one or more simplified triples included in the plurality of simplified triples is based in part on the first term that is a core term and a verb, and includes generating a conceptualized verb from the verb, wherein the step of generating the conceptualized verb includes:
  sending to a user a list of verbs included in a lexical database that lexically match the verb and determining a verb in the list of verbs whose definition is selected by the user;
  sending to the user a list of nouns included in the lexical database that are derivationally related forms of the verb whose definition is selected by the user and determining whether the user selects one of the nouns as having a meaning that matches a meaning of the conceptualized verb;
  if the user selects one of the nouns, designating the selected noun as the conceptualized verb;
  if the user does not select one of the nouns, sending to the user a list of hypernyms and hyponyms that the lexical database associates with the nouns in the list of nouns, and determining whether the user selects one of the hypernyms or one of the hyponyms;
  if the user selects one of the hypernyms or one of the hyponyms, designating the selected hypernym or hyponym ad the conceptualized verb;
  if the user does not select one of the hypernyms or hyponyms, creating the conceptualized verb by adding a suffix_ness to an end of the verb, and wherein the step of performing the enrichment transformation of the plurality of simplified triples is based in part on the conceptualized verb and includes the step of generating a new set of complex triples that represents the semantics of the definitions of core terms in the plurality of simplified triples, and wherein the method further comprises the steps of:
the computer system receiving a desired analysis depth and initializing an analysis depth parameter;
based on the grammar, the computer system syntactically transforming the new set of complex triples into a new syntactically transformed set of complex triples;
the computer system semantically transforming the new syntactically transformed set of complex triples into a new set of simplified triples;
the computer system updating the analysis depth parameter subsequent to the steps of syntactically transforming and semantically transforming; and
while the updated analysis depth parameter does not indicate the desired analysis depth, the computer system:
  performing an enrichment transformation on the new set of simplified triples to generate another new set of complex triples; and
  repeating, for the other new set of simplified triples, the steps of syntactically transforming, semantically transforming, and updating the analysis depth parameter.

5. The computer program product of claim 4, wherein the step of performing the syntactic transformation of the plurality of complex triples includes:
  determining a third term of the complex triple is a core term and is an adverb; and
  determining the adverb is linked to the verb which is the first term of the complex triple, wherein the step of performing the semantic transformation of the plurality of syntactically transformed complex triples into the respective one or more simplified triples included in the plurality of simplified triples is based in part on the adverb linked to the verb which is the first term in the complex triple and includes generating a conceptualized adverb from the adverb, wherein the step of generating the conceptualized adverb includes:
  sending to the user a list of adjectives that the lexical database associates with the adverb as pertainyms, and determining an adjective that the user selects from the list of adjectives;
  sending to the user a list of attributes that the lexical database designates as being similar to the selected adjective, and determining whether the user selects one of the attributes;
  if the user selects one of the attributes, designating the attribute as the conceptualized adverb;
  if the user does not select one of the attributes, sending the user a list of nouns included in the lexical database that are derivationally related forms of the selected adjective and determining whether the user selects one of the nouns as having a meaning that matches a meaning of the conceptualized adverb;
  if the user selects one of the nouns, designating the selected noun as the conceptualized adverb;
  if the user does not select one of the nouns, creating the conceptualized adverb by adding a suffix_ness to an end of the adverb, and wherein the step of performing the enrichment transformation of the plurality of simplified triples is based in part on the conceptualized adverb.

6. The computer program product of claim 4, wherein the method further comprises:
the computer system receiving a second plurality of complex triples extracted from other free-form text provided by another software application;
the computer system performing a syntactic transformation of the second plurality of complex triples, wherein a result of the step of performing the syntactic transformation is a second plurality of syntactically transformed complex triples whose terms are aligned to the grammar;
the computer system performing a semantic transformation of the second plurality of syntactically transformed complex triples into respective one or more simplified triples included in a second plurality of simplified triples;
based in part on the meta-schema of the reference ontology, the computer system performing an enrichment transformation of the second plurality of simplified triples into a second plurality of simplified and enriched triples by adding second relations derived from a correspondence each term in the second plurality of simplified triples has with the reference ontology and by adding second representations of semantics of definitions of terms in the second plurality of simplified triples, wherein the definitions of terms in the second plurality of simplified triples are included in the reference ontology;

the computer system storing the second plurality of simplified and enriched triples as a second new ontology that represents knowledge included within the second software application that provides the other free-form text;

the computer system syntactically and semantically transforming the plurality of simplified and enriched triples into a first new set of simple triples;

the computer system syntactically and semantically transforming the second plurality of simplified and enriched triples into a second new set of simple triples; and the computer system determining a cross-ontology correspondence between the new ontology and the second new ontology by the computer system determining a semantic correspondence between the first new set of triples and the second new set of triples.

7. The computer program product of claim 4, wherein the step of the computer system performing the semantic transformation of the plurality of syntactically transformed complex triples into the respective one or more simplified triples included in the plurality of simplified triples includes:

determining a noun is needed in a simplified triple of the respective one or more simplified triples;

determining the reference ontology and meta-schema of the reference ontology do not include a definition of the noun needed in the simplified triple;

generating the noun that is determined to be needed in the simplified triple;

generating a definition of the noun as relationships between the noun and terms in the new ontology being built;

storing the noun and the definition of the noun in the meta-schema of the reference ontology; and based in part on the stored noun and the stored definition of the noun, building a second new ontology.

8. A computer system comprising:

a central processing unit (CPU);

a memory coupled to the CPU; and a computer readable storage device coupled to the CPU, the storage device containing instructions that are executed by the CPU via the memory to implement a method of building an ontology, the method comprising the steps of:

the computer system extracting a plurality of complex triples from free-form text provided by a software application, each complex triple including a compound subject, a compound predicate and a compound object;

the computer system performing a syntactic transformation of the plurality of complex triples by, based on a grammar, identifying core terms and non-core terms in the plurality of complex triples, identifying syntactic elements in the plurality of complex triples including nouns, verbs, adjectives and adverbs, and standardizing the plurality of complex triples, wherein a result of the step of performing the syntactic transformation is a plurality of syntactically transformed complex triples whose terms are aligned to the grammar;

the computer system performing a semantic transformation of the plurality of syntactically transformed complex triples into respective one or more simplified triples included in a plurality of simplified triples by assigning each core term included in the plurality of simplified triples to exactly one term definition and to exactly one identification key of a reference ontology, wherein each simplified triple includes a subject term, a predicate term and an object term, and wherein each of the one or more simplified triples retains the semantics of the respective syntactically transformed complex triple;

based in part on a meta-schema of the reference ontology, the computer system performing an enrichment transformation of the plurality of simplified triples into a plurality of simplified and enriched triples by adding relations derived from a correspondence each term in the plurality of simplified triples has with the reference ontology and by adding representations of semantics of definitions of terms in the plurality of simplified triples, wherein the definitions are included in the reference ontology;

based on the plurality of simplified and enriched triples, the computer system generating a new ontology that is aligned with the reference ontology and that represents knowledge included within the software application that provides the free-form text, the new ontology addressing a first domain of expertise;

the computer system aligning another ontology with the reference ontology, the other ontology addressing a second domain of expertise that is different from the first domain of expertise; and based on the new ontology and the other ontology being aligned with the reference ontology, the computer system merging the new ontology and the other ontology even though the first and second domains of expertise are different, wherein the step of performing the syntactic transformation of the plurality of complex triples includes:

determining a first term of a complex triple included in the plurality of complex triples is a core term and is a verb; and determining a second term of the complex triple is an object, wherein the step of performing the semantic transformation of the plurality of syntactically transformed complex triples into the respective one or more simplified triples included in the plurality of simplified triples is based in part on the first term that is a core term and a verb, and includes generating a conceptualized verb from the verb, wherein the step of generating the conceptualized verb includes:

sending to a user a list of verbs included in a lexical database that lexically match the verb and determining a verb in the list of verbs whose definition is selected by the user;

sending to the user a list of nouns included in the lexical database that are derivationally related forms of the verb whose definition is selected by the user and determining whether the user selects one of the nouns as having a meaning that matches a meaning of the conceptualized verb;

if the user selects one of the nouns, designating the selected noun as the conceptualized verb;

if the user does not select one of the nouns, sending to the user a list of hypernyms and hyponyms that the lexical database associates with the nouns in the list of nouns, and determining whether the user selects one of the hypernyms or one of the hyponyms;

if the user selects one of the hypernyms or one of the hyponyms, designating the selected hypernym or hyponym ad the conceptualized verb;

if the user does not select one of the hypernyms or hyponyms, creating the conceptualized verb by adding a suffix_ness to an end of the verb, and wherein the step of performing the enrichment transformation of the plurality of simplified triples is based in part on the conceptualized verb and includes the step of generating a new set of complex triples that represents the semantics of the definitions of core terms in the plurality of simplified triples, and wherein the method further comprises the steps of:

the computer system receiving a desired analysis depth and initializing an analysis depth parameter;

based on the grammar, the computer system syntactically transforming the new set of complex triples into a new syntactically transformed set of complex triples;

the computer system semantically transforming the new syntactically transformed set of complex triples into a new set of simplified triples;

the computer system updating the analysis depth parameter subsequent to the steps of syntactically transforming and semantically transforming; and while the updated analysis depth parameter does not indicate the desired analysis depth, the computer system:

performing an enrichment transformation on the new set of simplified triples to generate another new set of complex triples; and repeating, for the other new set of simplified triples, the steps of syntactically transforming, semantically transforming, and updating the analysis depth parameter.

9. The computer system of claim 8, wherein the step of performing the syntactic transformation of the plurality of complex triples includes:

determining a third term of the complex triple is a core term and is an adverb; and determining the adverb is linked to the verb which is the first term of the complex triple, wherein the step of performing the semantic transformation of the plurality of syntactically transformed complex triples into the respective one or more simplified triples included in the plurality of simplified triples is based in part on the adverb linked to the verb which is the first term in the complex triple and includes generating a conceptualized adverb from the adverb, wherein the step of generating the conceptualized adverb includes:

sending to the user a list of adjectives that the lexical database associates with the adverb as pertainyms, and determining an adjective that the user selects from the list of adjectives;

sending to the user a list of attributes that the lexical database designates as being similar to the selected adjective, and determining whether the user selects one of the attributes;

if the user selects one of the attributes, designating the attribute as the conceptualized adverb;

if the user does not select one of the attributes, sending the user a list of nouns included in the lexical database that are derivationally related forms of the selected adjective and determining whether the user selects one of the nouns as having a meaning that matches a meaning of the conceptualized adverb;

if the user selects one of the nouns, designating the selected noun as the conceptualized adverb;

if the user does not select one of the nouns, creating the conceptualized adverb by adding a suffix_ness to an end of the adverb, and wherein the step of performing the enrichment transformation of the plurality of simplified triples is based in part on the conceptualized adverb.

10. The computer system of claim 8, wherein the method further comprises:

the computer system receiving a second plurality of complex triples extracted from other free-form text provided by another software application;

the computer system performing a syntactic transformation of the second plurality of complex triples, wherein a result of the step of performing the syntactic transformation is a second plurality of syntactically transformed complex triples whose terms are aligned to the grammar;

the computer system performing a semantic transformation of the second plurality of syntactically transformed complex triples into respective one or more simplified triples included in a second plurality of simplified triples;

based in part on the meta-schema of the reference ontology, the computer system performing an enrichment transformation of the second plurality of simplified triples into a second plurality of simplified and enriched triples by adding second relations derived from a correspondence each term in the second plurality of simplified triples has with the reference ontology and by adding second representations of semantics of definitions of terms in the second plurality of simplified triples, wherein the definitions of terms in the second plurality of simplified triples are included in the reference ontology;

the computer system storing the second plurality of simplified and enriched triples as a second new ontology that represents knowledge included within the second software application that provides the other free-form text;

the computer system syntactically and semantically transforming the plurality of simplified and enriched triples into a first new set of simple triples;

the computer system syntactically and semantically transforming the second plurality of simplified and enriched triples into a second new set of simple triples; and the computer system determining a cross-ontology correspondence between the new ontology and the second new ontology by the computer system determining a semantic correspondence between the first new set of triples and the second new set of triples.

11. The computer system of claim 8, wherein the step of the computer system performing the semantic transformation of the plurality of syntactically transformed complex triples into the respective one or more simplified triples included in the plurality of simplified triples includes:

determining a noun is needed in a simplified triple of the respective one or more simplified triples;

determining the reference ontology and meta-schema of the reference ontology do not include a definition of the noun needed in the simplified triple;

generating the noun that is determined to be needed in the simplified triple;

generating a definition of the noun as relationships between the noun and terms in the new ontology being built;

storing the noun and the definition of the noun in the meta-schema of the reference ontology; and based in part on the stored noun and the stored definition of the noun, building a second new ontology.

\* \* \* \* \*